(12) United States Patent
Abe et al.

(10) Patent No.: US 10,636,168 B2
(45) Date of Patent: Apr. 28, 2020

(54) IMAGE PROCESSING APPARATUS, METHOD, AND PROGRAM

(71) Applicant: SONY CORPORATION, Tokyo (JP)

(72) Inventors: Shinichiro Abe, Kanagawa (JP); Masaki Fukuchi, Tokyo (JP); Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 173 days.

(21) Appl. No.: 15/575,199

(22) PCT Filed: May 30, 2016

(86) PCT No.: PCT/JP2016/065863
§ 371 (c)(1),
(2) Date: Nov. 17, 2017

(87) PCT Pub. No.: WO2016/199605
PCT Pub. Date: Dec. 15, 2016

(65) Prior Publication Data
US 2018/0150974 A1 May 31, 2018

(30) Foreign Application Priority Data

Jun. 12, 2015 (JP) .................................. 2015-119627

(51) Int. Cl.
*G06K 9/00* (2006.01)
*G06T 7/73* (2017.01)
(Continued)

(52) U.S. Cl.
CPC .............. *G06T 7/75* (2017.01); *G06K 9/6256* (2013.01); *G06T 7/60* (2013.01); *G06T 7/74* (2017.01);
(Continued)

(58) Field of Classification Search
CPC ......... G06T 19/006; G06T 19/20; G06T 7/73; G06F 3/011; G06F 3/04815
(Continued)

(56) References Cited

U.S. PATENT DOCUMENTS 10,169,644 B2 * 1/2019 Silva .................... G06K 9/6209
2018/0268237 A1 * 9/2018 Stanimirovic ....... G06K 9/2018

FOREIGN PATENT DOCUMENTS

JP  2008-176509 A  7/2008
JP  2008-304268 A  12/2008
(Continued)

*Primary Examiner* — Charlotte M Baker
(74) *Attorney, Agent, or Firm* — Paratus Law Group, PLLC

(57) ABSTRACT

There is provided an image processing apparatus and method and a program which enable more accurate estimation of a pose. A matching unit performs matching processing on the basis of a detection result of a feature point from an input image and a three-dimensional map indicating a position of a landmark in real space, and a pose estimating unit estimates a pose on the basis of a result of the matching processing. A three-dimensional map updating unit updates the three-dimensional map on the basis of a three-dimensional shape model indicating a position and a shape of a recognition target, a detection result of the feature point from the input image and an estimation result of the pose so that only a portion of the recognition target is registered as the landmark. The present technology can be applied to a wearable information terminal apparatus.

15 Claims, 18 Drawing Sheets

(51) Int. Cl.
      *G06T 7/60*       (2017.01)
      *G06K 9/62*       (2006.01)

(52) U.S. Cl.
      CPC ...... *G06K 2209/21* (2013.01); *G06T 2200/04* (2013.01); *G06T 2200/08* (2013.01); *G06T 2207/30204* (2013.01)

(58) Field of Classification Search
      USPC .............................. 382/103, 190; 455/456.1
      See application file for complete search history.

(56) References Cited

FOREIGN PATENT DOCUMENTS

| | | |
|---|---|---|
| JP | 2009-237848 A | 10/2009 |
| JP | 2011-257963 A | 12/2011 |
| JP | 2013-225245 A | 10/2013 |
| JP | 2014-095553 A | 5/2014 |

* cited by examiner

IMAGE PROCESSING APPARATUS, METHOD, AND PROGRAM

CROSS REFERENCE TO PRIOR APPLICATION

This application is a National Stage Patent Application of PCT International Patent Application No. PCT/JP2016/065863 (filed on May 30, 2016) under 35 U.S.C. § 371, which claims priority to Japanese Patent Application No. 2015-119627 (filed on Jun. 12, 2015), which are all hereby incorporated by reference in their entirety.

TECHNICAL FIELD

The present technology relates to an image processing apparatus and method, and a program, and, more particularly, to an image processing apparatus and method and a program which enable more accurate estimation of a pose.

BACKGROUND ART

In related art, a technology called pose estimation, which estimates an own position and posture relative to a recognition target as an own pose is known. As such pose estimation, mainly, pose estimation using object recognition and pose estimation using environment recognition are widely known.

In the pose estimation using object recognition, an input image is photographed using a recognition target as a subject, and a pose is estimated through matching between feature points detected from the obtained input image and a dictionary obtained by learning the recognition target in advance.

Meanwhile, in the pose estimation using environment recognition, a three-dimensional map indicating positions of portions of a subject in three-dimensional space, which are characteristic in an ambient environment, is generated by learning an environment around the recognition target online, that is, in real time. That is, the three-dimensional map is sequentially updated. Then, a pose is estimated from the three-dimensional map obtained through learning and feature points detected from an input image obtained through photographing.

As such pose estimation using environment recognition, for example, simultaneously localization and mapping (SLAM), or the like, is known.

Further, as a technology relating to pose estimation, there is also a technology of recognizing an object on an input image by registering a feature amount of local feature points of a subject image which is made a recognition target in an image feature database and comparing the registered feature amount with a feature amount of local feature points detected from a photographed input image.

As such a technology of recognizing an object on an image, a technology of removing unnecessary local feature points on the basis of density of local feature points so that a feature amount of local feature points which are uniformly distributed on a subject image is registered in the image feature database, has been also proposed (see, for example, Patent Literature 1). According to this technology, it is possible to reduce a data amount of the image feature database.

CITATION LIST

Patent Literature

Patent Literature 1: JP 2011-257963A

DISCLOSURE OF INVENTION

Technical Problem

However, with the above-described technology, it is impossible to estimate a pose more accurately.

For example, in the pose estimation using object recognition, because sufficient feature points cannot be detected if an image for learning which is used for learning for obtaining a dictionary and which includes a recognition target as a subject includes less image texture, it is impossible to estimate a pose accurately even if the dictionary obtained through learning is used.

Further, in the pose estimation using object recognition, it is impossible to estimate a pose if the photographed recognition target does not have a certain size (scale) in the input image, and, further, a practical method in the case where a three-dimensional object is made a target is unestablished.

Further, in the pose estimation using environment recognition, because it is assumed that an ambient environment is a static environment, and, if a position of the recognition target moves or the recognition target is blocked by other subjects such as the hand, the three-dimensional map may collapse, and it may become impossible to estimate a pose relative to the recognition target. Further, because there is ambiguity in the three-dimensional map, a result of the pose estimation may include a cumulative error.

The present technology has been made in view of such circumstances, and is directed to enabling more accurate estimation of a pose.

Solution to Problem

According to an aspect of the present technology, an image processing apparatus includes: a three-dimensional map generating unit configured to, on the basis of a shape model indicating a position and a shape of a recognition target in three-dimensional space and a detection result of a feature point from an input image obtained by photographing a subject in the three-dimensional space, register a portion of the recognition target corresponding to the feature point as a landmark and generate a three-dimensional map indicating a position of the landmark in the three-dimensional space.

The three-dimensional map generating unit may obtain a ray vector which passes a position of a point of view when the input image is photographed and a position of the feature point of the input image on a projection plane and generate the three-dimensional map on the basis of the ray vector and the shape model.

In the case where the ray vector intersects the recognition target in the three-dimensional space, the three-dimensional map generating unit may register a position where the recognition target intersects the ray vector in the three-dimensional map as the landmark.

In the case where a distance between the ray vector and the recognition target in the three-dimensional space is equal to or less than a predetermined threshold, the three-dimensional map generating unit may register a position in the recognition target closest to the ray vector in the three-dimensional map as the landmark.

The image processing apparatus may further include: a pose estimating unit configured to estimate a pose on the basis of the three-dimensional map and a detection result of the feature point from the input image.

The pose estimating unit may track the pose on the basis of the three-dimensional map and the detection result of the feature point from the input image.

The three-dimensional map generating unit may control detection of the feature point for each region in a new input image on the basis of the number of the landmarks within each of a plurality of divided regions obtained by dividing a region of the recognition target, and a result of specifying a region corresponding to the divided region in the input image.

The three-dimensional map generating unit may control detection of the feature point such that more feature points are detected from a region of the new input image corresponding to the divided region with less landmarks registered in the three-dimensional map.

The three-dimensional map generating unit may specify a region corresponding to a specific region on the recognition target in the input image and controls detection of the feature point from the new input image on the basis of a result of specifying the region corresponding to the specific region.

The three-dimensional map generating unit may control detection of the feature point such that more feature points are detected from the region corresponding to the specific region in the new input image.

The image processing apparatus may further include: an initial pose estimating unit configured to estimate an initial pose through object recognition on the basis of a detection result of the feature point from the input image and a dictionary obtained through learning in advance.

The image processing apparatus may further include: an initial pose estimating unit configured to estimate an initial pose on the basis of output from a sensor which measures a position of the image processing apparatus and output from a sensor which measure inclination of the image processing apparatus.

The three-dimensional map generating unit may generate the three-dimensional map on the basis of an estimation result of the initial pose, a detection result of the feature point from the input image, and the shape model.

According to an aspect of the present technology, an image processing method or program includes steps of:

on the basis of a shape model indicating a position and a shape of a recognition target in three-dimensional space and a detection result of a feature point from an input image obtained by photographing a subject in the three-dimensional space, registering a portion of the recognition target corresponding to the feature point as a landmark and generating a three-dimensional map indicating a position of the landmark in the three-dimensional space.

According to an aspect of the present technology, on the basis of a shape model indicating a position and a shape of a recognition target in three-dimensional space and a detection result of a feature point from an input image obtained by photographing a subject in the three-dimensional space, a portion of the recognition target corresponding to the feature point is registered as a landmark and a three-dimensional map indicating a position of the landmark in the three-dimensional space is generated.

Advantageous Effects of Invention

According to an aspect of the present technology, it is possible to estimate a pose more accurately.

Note that advantageous effects of the present technology are not limited to those described here and may be any advantageous effect described in the present disclosure.

MODES FOR CARRYING OUT THE INVENTION

Embodiments in which the present technology is applied will be described below with reference to the drawings.

First Embodiment

<Outline of Present Technology>

The present technology is directed to enabling more accurate and robust estimation of a pose by generating or updating a three-dimensional map to be used for pose estimation on the basis of a shape model of a recognition target disposed in three-dimensional space.

The present technology can be applied to an application program for realizing, for example, augmented reality (AR) in which information such as an image is displayed while the image is superimposed on an actual environment, virtual reality (VR) in which virtual reality is provided, or the like. Further, such an application program to which the present technology is applied can be implemented on various kinds of equipment such as, for example, a smartphone, a tablet-type information terminal apparatus, a wearable information terminal apparatus and a quad-copter.

As described above, the technology for performing pose estimation includes pose estimation using object recognition and pose information using environment recognition.

Now, it is assumed that an application program for displaying AR content while superimposing the AR content on a postcard disposed in real space is realized.

Figure 1:
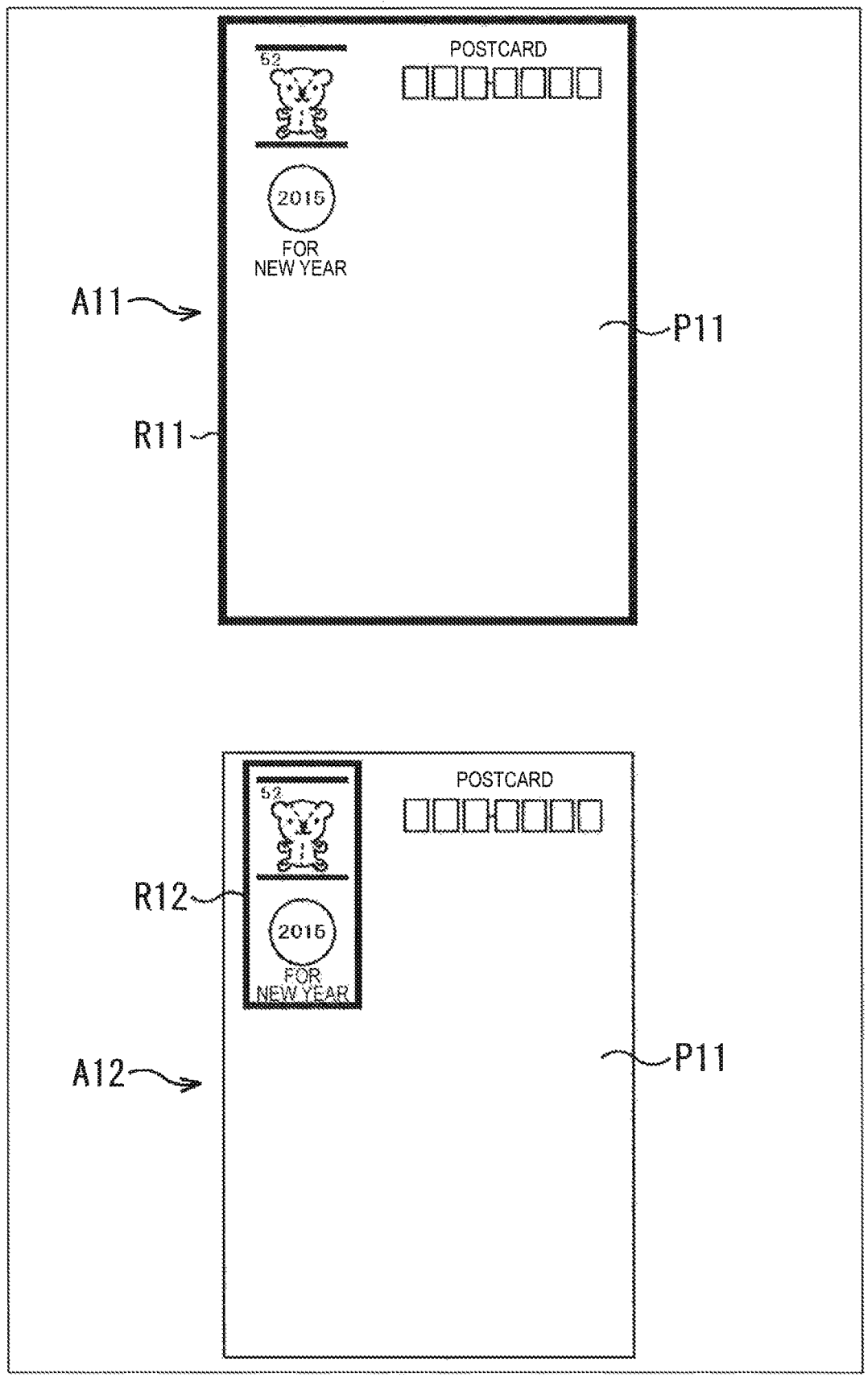
FIG. 1 is a diagram explaining pose estimation using object recognition.

In this case, to estimate an own pose in real space by utilizing pose estimation using object recognition and display AR content while superimposing the AR content on a postcard in real space from the estimation result, for example, there can be two approaches as illustrated in FIG. 1.

That is, as the first approach, as indicated with an arrow A11 in FIG. 1, there can be a method in which a dictionary for a region R11 is generated while the whole region R11 of the actual postcard P11 disposed in real space is made a recognition target.

Upon pose estimation, first, initialization is performed. In initialization, a pose is estimated using a dictionary while the whole region R11 which is made a recognition target is set as a target, and an own position and posture in real space is obtained as an initial pose. After initialization is performed, a pose is estimated using the dictionary and a movement model, and a pose at each time is obtained. That is, the own pose is tracked on the basis of the initial pose.

In this manner, a pose is estimated while the whole region R11 which is made a recognition target is set as a target upon initialization. However, in the example indicated with the arrow A11, most part of the region R11 which is made a recognition target is plain, that is, does not include texture.

Because a feature point is not detected from a plain region with no texture, if a ratio of a plain region in the whole region R11 which is a recognition target is high as in this example, it is difficult to recognize the region R11 which is a recognition target from the photographed input image. As a result, an initial pose cannot be obtained.

As the second approach, there can be a method in which a dictionary is generated for a region R12 while the region R12 of a stamp portion which is a region including texture among the postcard P11 is made a recognition target as indicated with an arrow A12.

In this case, because feature points can be detected from the whole region R12 if the photographed region R12 has a certain size (scale) in the input image, it is possible to estimate an initial pose.

However, for example, when a camera which photographs the input image moves away from the postcard P11 over time and the postcard P11 is zoomed out, a size (scale) of the region R12 in the input image becomes small. As a result, it is difficult to estimate a pose because error matching upon matching of feature points increases due to deficiency in resolution and disturbance noise).

Figure 2:
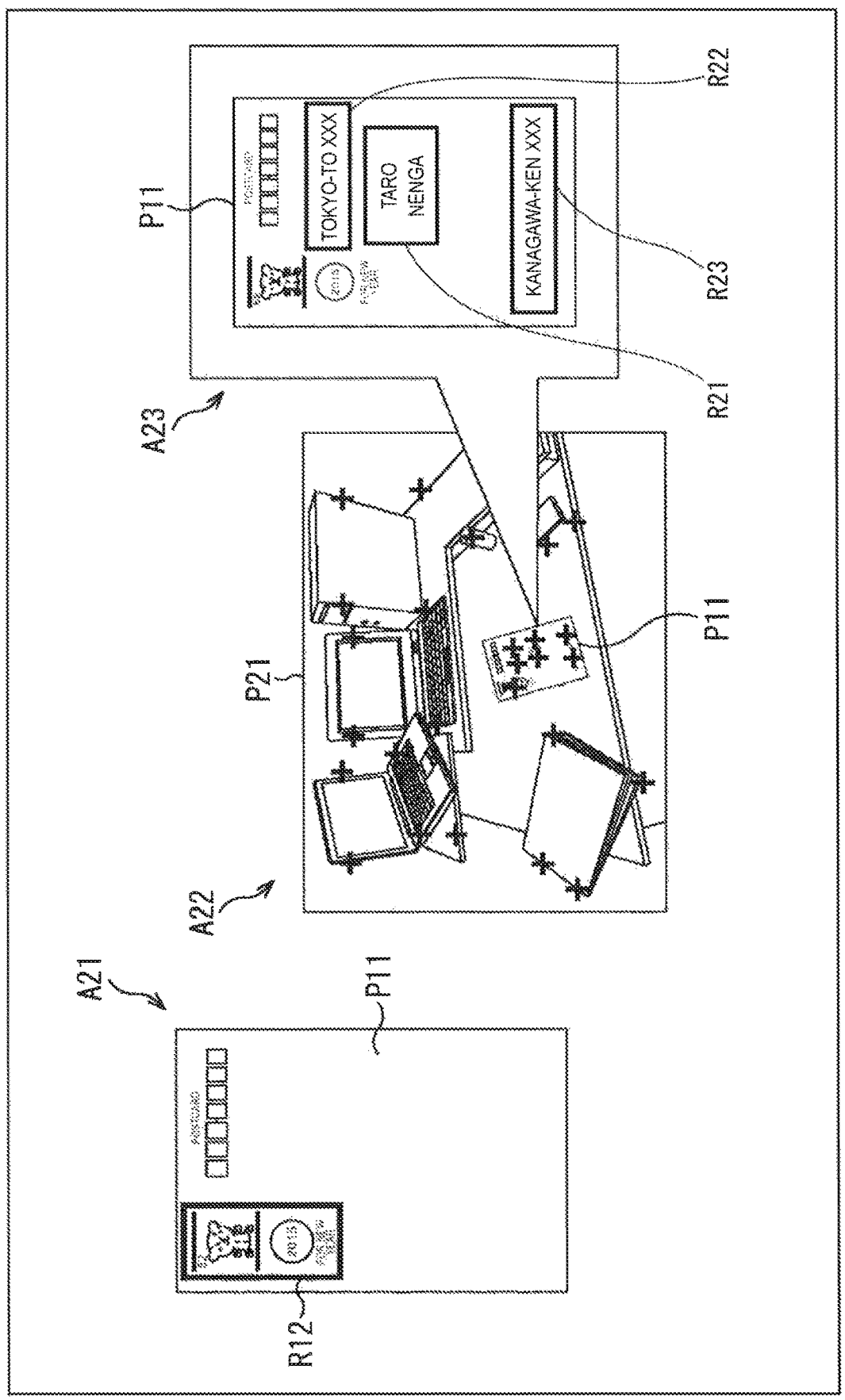
FIG. 2 is a diagram explaining pose estimation using environment recognition.

Further, when an own pose in real space is estimated by utilizing pose estimation using environment recognition, and AR content is displayed while the AR content is superimposed on a postcard in real space from the estimation result, for example, there can be an approach as illustrated in FIG. 2. Note that, in FIG. 2, the same reference numerals are assigned to portions corresponding to the portions in FIG. 1, and description thereof will be omitted as appropriate.

For example, there can be a method in which initialization is performed using a dictionary generated while the region R12 of a stamp portion of the postcard P11 is made a recognition target as indicated with an arrow A21 in FIG. 2, and, thereafter, an ambient environment including the postcard P11 is learned as indicated with an arrow A22, and a pose is tracked using a three-dimensional map.

In this case, if the dictionary is generated for the region R12 of the stamp portion as indicated with the arrow A21, as with the case of the example indicated with the arrow A12 in FIG. 1, it is possible to estimate an initial pose through object recognition using the dictionary.

After the initial pose is estimated, as indicated with the arrow A22, a three-dimensional map is generated while a subject portion in real space, which corresponds to feature points detected from the input image P21, is made a landmark, and a pose is estimated while the three-dimensional map is sequentially updated.

Here, the three-dimensional map is information indicating a position of the landmark in three-dimensional space (real space), which is a specific portion of a subject existing in real space.

In pose estimation using environment recognition, after initialization is performed, correspondence relationship between feature points detected from the input image P21 photographed with a camera and a landmark indicated with the three-dimensional map is obtained, and the three-dimensional map is updated at the same time as estimation of the own pose.

In the example indicated with the arrow A22, portions of symbols "-" drawn on the input image P21 indicate feature points detected from the input image P21.

For example, as indicated with an arrow A23, feature points are detected from the region R21 which is a portion of recipient's name in the postcard P11 and a region R22 and a region R23 which are portions where address is described. Further, in the input image P21, feature points are also detected from portions other than the postcard P11. Note that the postcard P11 indicated with the arrow A23 is enlarged display of a portion of the postcard P11 in the input image P21.

In the pose estimation using environment recognition, the three-dimensional map can be obtained by learning an ambient environment such as a portion around the region R12 of the stamp portion of the postcard P11 which is made a target for generation of the dictionary, that is, a portion of recipient's name and a portion of address of the postcard P11, other background portions, and portions of other subjects located around the postcard P11. Therefore, even if the region R12 of the stamp portion which is made a target for generation of the dictionary becomes small on the input image P21, it is possible to track the pose.

However, in the pose estimation using environment recognition, a portion of a subject other than the postcard P11 on which the AR content is to be superimposed and displayed is also registered in the three-dimensional map as a landmark. Therefore, if a recognition target such as the postcard P11 is moved or the recognition target is blocked and cannot be observed on the input image, the three-dimensional map collapses. As a result, it may become impossible to continuously estimate a pose or estimate a pose accurately.

Further, in the pose estimation using environment recognition, in principle, because there is ambiguity in the three-dimensional map, a cumulative error occurs in pose estimation using such a three-dimensional map.

Figure 3:
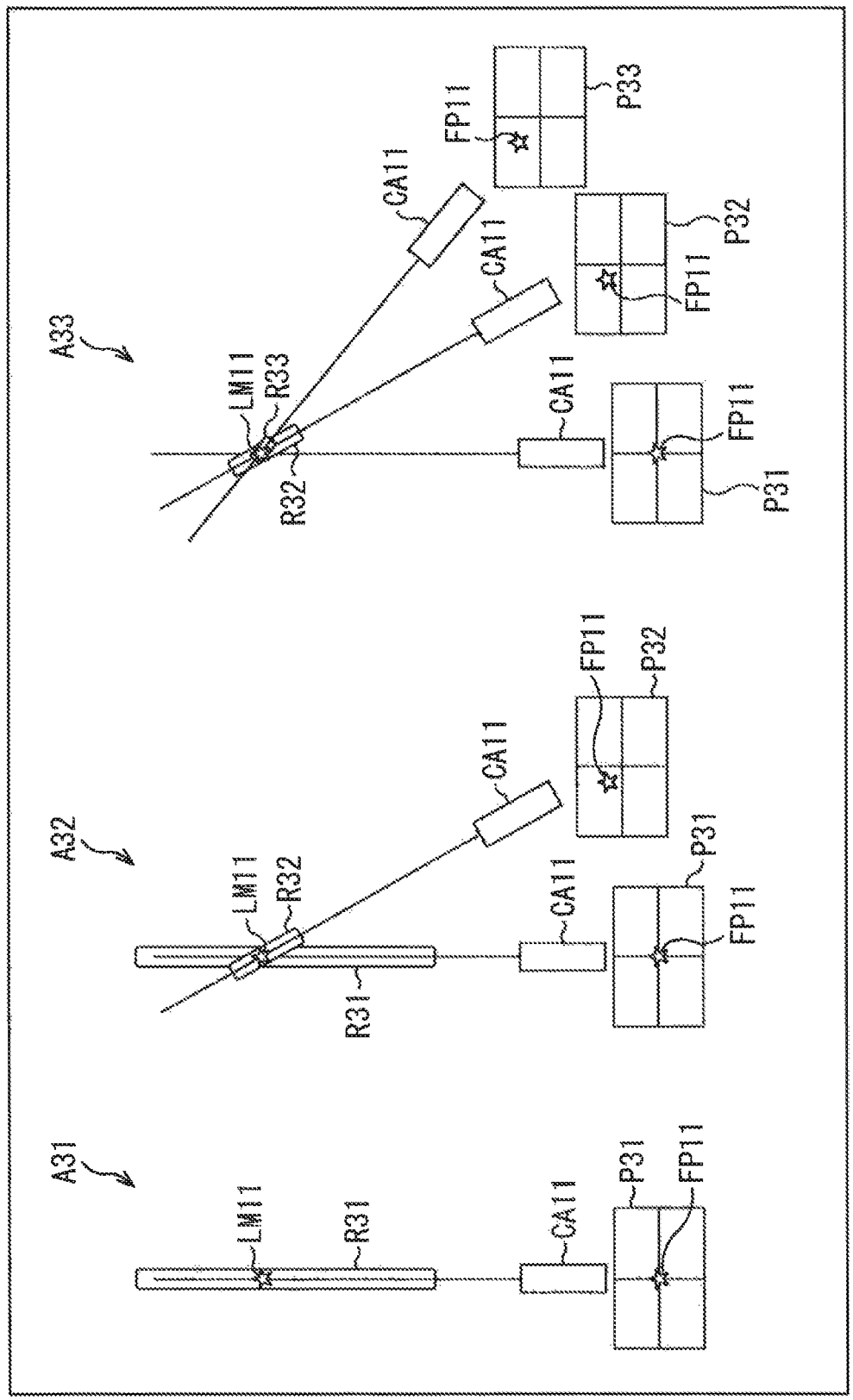
FIG. 3 is a diagram explaining a cumulative error.

For example, as indicated with an arrow A31 in FIG. 3, it is assumed that, when an input image P31 is photographed with a camera CA11 for the first time, a feature point FP11 is detected from the input image P31.

In this case, it is ambiguous at which position on the line of sight of the camera CA11 a portion LM11 of a subject corresponding to the feature point FP11 is located in real space. That is, as an estimation result of the position of the portion LM11 in real space, probability distribution R31 of the estimated position is obtained. The portion LM11 in real space is registered in the three-dimensional map as the landmark.

Further, as indicated with an arrow A32, it is assumed that the second photographing is performed using the camera CA11, and, as a result, a feature point FP11 is detected from an input image P32 obtained through the photographing.

In this case, probability distribution R32 of the estimated position can be obtained as an estimation result of the position of the portion LM11 in real space from a position where the feature point FP11 is observed in the input image P31 and a position where the feature point FP11 is observed in the input image P32. The three-dimensional map is updated on the basis of the estimation result of the position of the portion LM11.

By performing observation twice in this manner, it is possible to obtain probability distribution R32 of the estimated position, whose distribution width is narrower than that of the probability distribution R31 of the estimated position obtained first.

Further, as indicated with an arrow A33, it is assumed that third photographing is performed using the camera CA11, and, as a result, a feature point FP11 is detected from an input image P33 obtained through photographing. In this case, probability distribution R33 of the estimated position is obtained as an estimation result of the position of the portion LM11 in real space from positions where the feature point FP11 is observed in the input image P32 and in the input image P33, and the three-dimensional map is updated.

By observation being performed in this manner, the width of the probability distribution of the estimated position obtained as a result of estimation of the position of the portion LM11 in real space is narrowed down, so that the estimated position of the portion LM11 in real space converges.

In the pose estimation using environment recognition, by only a landmark with less ambiguity being registered in the three-dimensional map using time-series information, that is, positions of feature points on the input image at each time, it is possible to estimate a pose robustly. However, as a result of pose estimation and updating of the three-dimensional map being repeatedly performed, an error of the estimation result of the own pose caused due to ambiguity of the position of the landmark is accumulated. In the pose estimation using environment recognition, because such a cumulative error is generated, it is impossible to estimate a pose accurately.

Therefore, in the present technology, a three-dimensional shape model indicating a shape of a recognition target and a position of the recognition target in three-dimensional space when the pose estimation using environment recognition is performed, is acquired, and only a portion on the recognition target is registered in the three-dimensional map as a landmark from the three-dimensional shape model and a detection result of the feature points from the input image.

By this means, it is possible to prevent a portion on an animal body located in an ambient environment from being registered in the three-dimensional map as a landmark, or the three-dimensional map from collapsing when the recognition target is blocked by other subjects. Further, because a position of a portion registered as the landmark becomes clear by the three-dimensional shape model, a cumulative error does not occur in pose estimation. Therefore, according to the present technology, it becomes possible to estimate an own pose more accurately and robustly.

In the present technology, a pose is estimated roughly through the following procedure.

(Procedure 1) Acquire a three-dimensional shape model of a recognition target (Procedure 2) Initialize a pose (Procedure 3) Estimate a pose using environment recognition Here, there may be one recognition target or a plurality of recognition targets in procedure 1. Further, as a method for initializing a pose, that is, estimating an initial pose, a dictionary for object recognition may be used, or an own pose may be directly measured using a global positioning system (GPS) sensor, a gyro sensor, an electronic compass, or the like. In the following description, description will be continued assuming that a pose is initialized using object recognition using a dictionary obtained in advance through learning.

Further, in the pose estimation in procedure 3, estimation of an own pose and updating of the three-dimensional map are performed at the same time. Here, upon updating of the three-dimensional map, only a portion on the recognition target indicated with the three-dimensional shape model is registered as a landmark.

Here, for example, a case will be considered where a pose is estimated according to procedure 1 to procedure 3, and AR content is displayed while the AR content is superimposed on a postcard located in real space.

Figure 4:
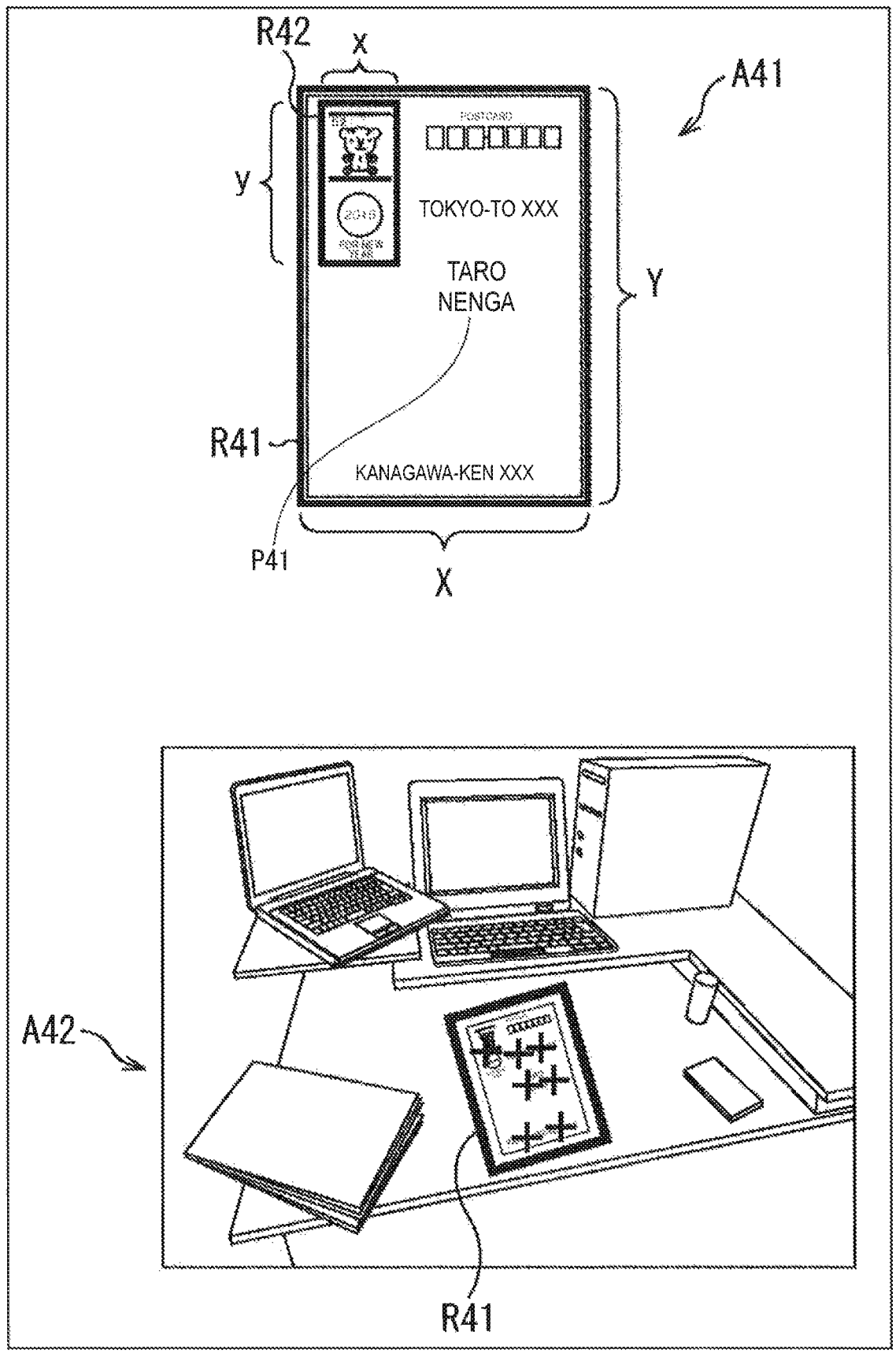
FIG. 4 is a diagram explaining the present technology.

In such a case, for example, as indicated with an arrow A41 in FIG. 4, the whole region R41 of the actual postcard P41 disposed in real space is made a recognition target upon estimation of a pose using environment recognition.

Then, information formed with a length X in a lateral direction and a length Y in a longitudinal direction of the region R41 for specifying the shape of the region R41, and a three-dimensional coordinate indicating a position where the postcard P41 is disposed in real space, is acquired as the three-dimensional shape model.

Further, a dictionary for initialization is generated in advance while the region R42 of a stamp portion included in the postcard P41, that is, a rectangular region whose length in a lateral direction is x, and whose length in a longitudinal direction is y, located at an upper left portion in the postcard P41 in FIG. 4 is made a target.

Then, after a pose is initialized using such a dictionary, pose is estimated and the three-dimensional map is updated using the three-dimensional shape model indicating a shape of the region R41 and a position where the region R41 is disposed, the three-dimensional map and the photographed input image.

In this case, as indicated with an arrow A42, among a portion of the subject in real space corresponding to the feature points detected from the input image, only a portion within the region R41 of the whole postcard P41 is registered in the three-dimensional map as a landmark.

Further, when a pose is estimated, the AR content is displayed while the AR content is superimposed on a portion of the postcard P41 on the basis of the estimation result. That is, for example, in the case where the user wears a wearable device, and a pose of the wearable device is estimated as the pose of the user, predetermined AR content is displayed at a portion of the postcard P41 at a transmission-type display unit constituting the wearable device.

<Concerning Acquisition of Three-Dimensional Shape Model>

Subsequently, acquisition of the three-dimensional shape model and updating of the three-dimensional map will be described in more detail. First, the three-dimensional shape model will be described.

As described above, the three-dimensional shape model is a shape model of the recognition target for determining a three-dimensional coordinate of the landmark to be registered in the three-dimensional map.

The shape of the recognition target may be a complicated three-dimensional shape which is formed with, for example, point cloud (set of points) as well as a simple shape such as a plain surface and a spherical surface.

The three-dimensional shape model is formed with information indicating a position and a posture of the recognition target in real space and information specifying the shape of the recognition target.

For example, the information specifying the shape of the recognition target is a coordinate, or the like, indicating a position of each portion of the recognition target in a three-dimensional coordinate system (hereinafter, also referred to as a model fixed coordinate system) on the basis of the recognition target. In the following description, the information for specifying the shape of the recognition target such as a coordinate of each portion of the recognition target in the model fixed coordinate system will be referred to as shape information.

Further, information indicating a position and a posture of the recognition target in real space is, for example, a coordinate indicating a position of the recognition target and information indicating a posture in a three-dimensional coordinate system (hereinafter, referred to as a world coordinate system) for specifying each position in real space in which a predetermined position in real space is set as the origin.

For example, in this example, information formed with a coordinate indicating a position of the origin of the model fixed coordinate system of the recognition target in the world coordinate system and a rotation angle of the model fixed coordinate system with respect to the world coordinate system is information indicating the position and the posture of the recognition target. In the following description, information indicating the position and the posture of the recognition target in the world coordinate system will be referred to as an external parameter.

In this manner, the three-dimensional shape model of the recognition target is formed with the shape information and the external parameter. Note that there may be one recognition target or a plurality of recognition targets to be used for tracking the own pose.

Further, any method for constructing the three-dimensional shape model can be used.

For example, if the recognition target has a simple shape such as a planar shape and a cylindrical shape, it is possible to construct the three-dimensional shape model by the user, a creator of the application program, or the like, physically measuring the shape and the position using a ruler, or the like, in advance.

Further, it is also possible to construct the three-dimensional shape model by obtaining the shape of the recognition target from the image through reconstruction using a plurality of cameras or acquiring distance information using an RGBD camera or a laser rangefinder and obtaining the shape and the position of the recognition target.

Further, the three-dimensional shape model may be constructed at an image processing apparatus which estimates a pose, or may be acquired from other apparatuses by the image processing apparatus.

For example, in the case where the recognition target is determined in advance, it is possible to construct a three-dimensional shape model using a program executed by the image processing apparatus.

Specifically, in the case where the image processing apparatus constructs the three-dimensional shape model by executing the program, for example, if the user, or the like, designates a radius and a height, the image processing apparatus may generate shape information indicating a shape of a cylindrical model determined by the designated radius and height. In this manner, in the case where the three-dimensional shape model is constructed on the basis of designated values from outside such as the user, the position and the posture of the recognition target in the world coordinate system may be designated by the user, or the like, or the position and the posture determined in advance may be used.

Further, the three-dimensional shape model constructed in advance may be stored as data in a program itself for estimating the own pose and performing processing using the estimation result.

Still further, in the case where there are a plurality of candidates for the recognition target to be used for tracking the awn pose, it is necessary to store a database, or the like, in which related information such as an ID for specifying the recognition target and position information, and the three-dimensional shape model of the recognition target are paired. This database may be stored in advance by, for example, the image processing apparatus, or the image processing apparatus may download (acquire) part or all of the database from a server via a communication network, or the like.

Specifically, for example, in the case where an application program is utilized at a specific outdoor location, it is assumed that there are a plurality of areas where the application program can be utilized. Further, it is assumed that a recognition target to be used for tracking a pose is different for each area.

In such a case, a three-dimensional shape model of the recognition target is prepared for each area, and a database is created by associating related information formed with an object ID indicating the recognition target and position information indicating the area with the three-dimensional shape model of each area.

In the case where the application program is actually utilized, for example, it is only necessary to photograph an ambient environment including the recognition target as the subject, specify the recognition target by performing object recognition on the obtained input image, and select a three-dimensional shape model associated with the object ID corresponding to the recognition target. Further, it is also possible to select a three-dimensional shape model with which position information of an area indicated by information indicating the area is associated on the basis of the information input from outside.

<Concerning Updating of Three-Dimensional Map>

Updating of the three-dimensional map will be described next.

As described above, in the pose estimation, the three-dimensional map formed with information relating to the registered landmark is utilized.

More specifically, the three-dimensional map is formed with a coordinate (three-dimensional coordinate) of the landmark in the world coordinate system and a feature amount of the landmark obtained for each of one or more registered landmarks.

Here, the feature amount of the landmark is an image (hereinafter, referred to as a template image) of a region formed with a predetermined number of pixels including a feature point corresponding to the landmark in, for example, the input image obtained by photographing the own circumference.

For example, a region of five pixels×five pixels centered on the feature point corresponding to the landmark on the input image is cut out and made a template image. Further, the template image as the feature amount is prepared for each of a plurality of scales of the input image, that is, for each resolution (size).

Further, in the three-dimensional map, a template image of each scale obtained from each of one or more input images photographed at different positions in real space is registered as the feature amount.

The template image of the landmark is registered for each input image obtained in chronological order to address change of the own point of view, that is change of vision of the landmark on the input image due to change of the own position and posture. In a similar manner, the template image of each scale is registered as the feature amount to address change of scales (sizes) of surrounding subjects including feature points on the input image due to change of the own position.

By performing template matching using a template image for each scale at each point of view, it is possible to associate the feature points on the image with the landmark registered in the three-dimensional map more robustly and with higher accuracy even if the own point of view changes.

In the present technology, the three-dimensional map is updated on the basis of the input image photographed at a predetermined position in real space and the three-dimensional shape model of the recognition target.

Figure 5:
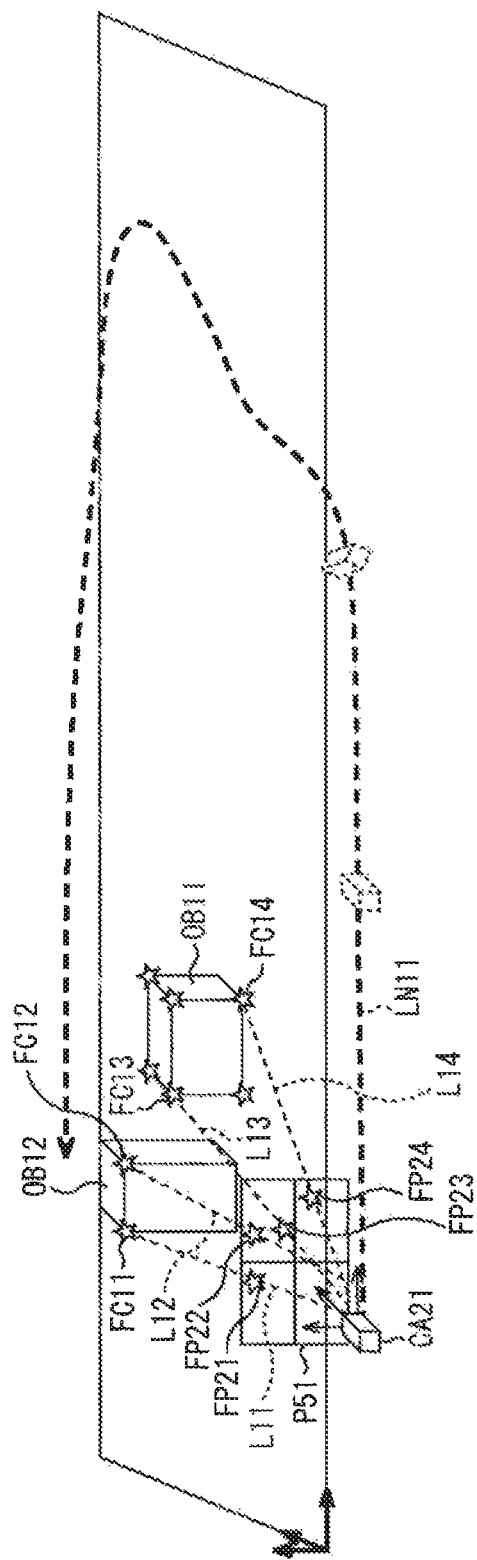
FIG. 5 is a diagram explaining registration of a landmark in a three-dimensional map.

For example, as illustrated in FIG. 5, it is assumed that a pose of the camera CA21 at each time is estimated while the camera CA21 which estimates a pose in real space moves as indicated with a dotted line LN11, and there are two objects OB11 and OB12 in real space.

Here, the object OB11 is an object which is a recognition target when a pose of the camera CA21 is tracked, and the camera CA21 stores a three-dimensional shape model of the object OB11. Further, the object OB12 is an object which is not a recognition target when the pose of the camera CA21 is tracked.

Now, it is assumed that, as a result of photographing by the camera CA21 at predetermined time, an input image P51 can be obtained. Here, the input image P51 is drawn at a position on a projection surface determined from the pose of the camera CA21, a focal length of the camera CA21, or the like.

Further, in this example, on the input image P51, images of a portion FC11 and a portion FC12 of the object OB12 and images of a portion FC13 and a portion FC14 of the object OB11 are projected. Then, it is assumed that, as a result of feature points being detected from the input image P51, a feature point FP21 to a feature point FP24 are detected at positions of respective images of the portion FC11 to the portion FC14 on the input image P51.

In this case, if the pose of the camera CA21 at current time, and positions of respective feature points on the input image P51, that is, positions of respective feature points on a world coordinate system on the projection image which is the input image P51, disposed on the projection surface, are known, it is possible to obtain a ray vector which connects (passes) a point of view of the camera CA21 and respective feature points.

Here, it is possible to obtain a ray vector L11 to a ray vector L14 which respectively pass the point of view of the camera CA21 and the feature point FP21 to feature point FP24 in the world coordinate system (three-dimensional space).

Further, at the camera CA21, a pose of the object OB11 in the world coordinate system, that is, the position, the posture and the shape of the object OB11 are known by a three-dimensional shape model of the object OB11 which is a recognition target. Therefore, it is possible specify whether or not each of the ray vector L11 to the ray vector L14 intersects the object OB11 in real space.

The camera CA21 selects a feature point where the ray vector intersects the object OB11 which is a recognition target among the feature points detected from the input image P51, and registers a portion of the object OB11 corresponding to the selected feature point, that is, a position of the intersection point between the ray vector and the recognition target as a landmark. Adversely, the camera CA21 does not register a portion of the subject corresponding to the feature point as a landmark for feature points where the ray vector does not intersect the object OB11 which is the recognition target.

In this example, because the ray vector L13 and the ray vector L14 intersect the object OB11 which is the recognition target, the portion FC13 corresponding to the feature point FP23 and the portion FC14 corresponding to the feature point FP24 are registered as landmarks in the three-dimensional map.

That is, a region including the feature point FP23 in the input image P51 is made a template image, and the template image and the coordinate of the portion FC13 in the world coordinate system are registered in the three-dimensional map. In a similar manner, a region including the feature point FP24 in the input image P51 is made a template image, and the template image and the coordinate of the portion FC14 in the world coordinate system are registered in the three-dimensional map.

Meanwhile, for the feature point FP21 and the feature point FP22 where the ray vector does not intersect the object OB11, landmarks are not registered in the three-dimensional map.

A method in which ray received within an angle of view of the camera CA21 is tracked in a reverse direction centering around the point of view of the camera CA21 through arithmetic operation processing, and a subject located in the direction is specified, is called a ray tracing method.

With the present technology, for the feature point where the recognition target intersects the ray vector, a portion of the recognition target corresponding to the feature point is registered as a landmark in the three-dimensional map. By this means, it is possible to prevent an animal body, or the like, from being registered as the landmark and it is possible to register only a portion of the recognition target whose pose is known as the landmark. As a result, it is possible to prevent collapse of the three-dimensional map or occurrence of a cumulative error in pose estimation, so that it is possible to estimate the own pose more accurately and robustly.

Note that, here, while a case where a landmark is registered for a feature point where the recognition target intersects the ray vector has been described, it is also possible to register a landmark for a feature point where a distance between the recognition target and the ray vector in the world coordinate system is equal to or less than a predetermined threshold.

<Concerning Dictionary and Tracking of Pose>

Further, a specific example of a region which is made a recognition target to be used for initialization of the pose, that is, a target for which a dictionary is to be generated, and a recognition target upon tracking of the pose will be described.

Figure 6:
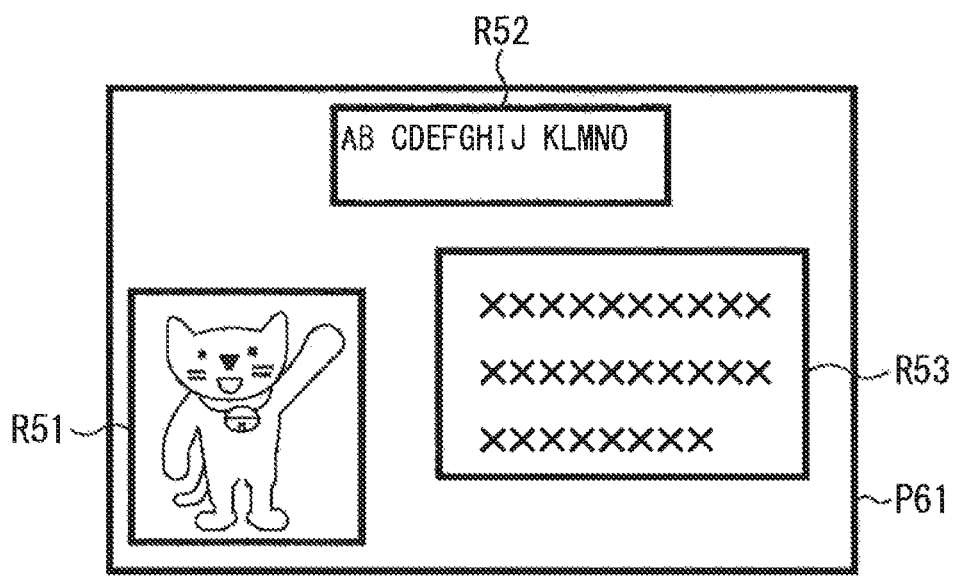
FIG. 6 is a diagram illustrating an example of a recognition target of a dictionary and a recognition target upon tracking of a pose.

For example, in the case where the AR content displayed while the AR content is superimposed on an object in the form of a card such as a postcard, a New Year's greeting card and a message card, as illustrated in FIG. 6, a form portion on the card P61 disposed in real space is made a target for which a dictionary is to be generated.

In this example, the card P61 includes a region R51 of illustration printed in advance, a region R52 of characters printed in advance and a region R53 of characters written in the card P61.

Normally, the message card, or the like, includes a form portion such as a stamp and illustration printed in advance, and a non-form portion such as recipient's name and message written by a user, or the like.

Among these, because the form portion is a portion including texture and thus a region where a feature point can be detected, and is a portion whose position, pattern, or the like, are known in advance, the form portion is a region which can be utilized for pre-learning.

Meanwhile, because the non-form portion is a portion written afterward in a message card, or the like, the non-form portion is a region which has low versatility and which is not suitable to be utilized for pre-learning. However, because a feature point can be detected from the non-form portion, the non-form portion can be used for learning an ambient environment online for tracking the pose.

Therefore, for example, it is only necessary to generate a dictionary for initialization using a portion of the region R51 using the portion of the region R51 which is a form portion as a recognition target upon initialization of the pose and generate and update the three-dimensional map using a region of the whole card P61 as a recognition target upon tracking of the pose. Because the shape of the whole card P61 can be acquired in advance, information indicating the position and the posture of a rectangular plane surface portion of the whole card P61 is used as the three-dimensional shape model.

Because the whole card P61 includes the region R51 and the region R52 which are form portions, and the region R53 which is a non-form portion, it is possible to register an appropriate landmark in the three-dimensional map. Note that, in this case, because the shape of the card P61 is substantially a two-dimensional shape, shape information of the three-dimensional shape model becomes information indicating a two-dimensional rectangular region.

Further, it is also possible to set a three-dimensional object as well as a two-dimensional object as a recognition target. For example, as illustrated in FIG. 7, it is also possible to set a cylindrical object as a recognition target.

In the case where a cylindrical recognition target P71 which is a three-dimensional object is disposed in real space, it is possible to set a region R61 which is a portion of a form in the recognition target P71 as a recognition target upon initialization. In this case, a dictionary for initialization is generated using a portion of the region R61.

Further, the three-dimensional map is generated and updated using the whole cylindrical recognition target P71 as a recognition target upon tracking of the pose. Because it is possible to obtain the three-dimensional shape of such a recognition target P71 through simple calculation, it is possible to easily obtain the three-dimensional shape model.

Figure 7:
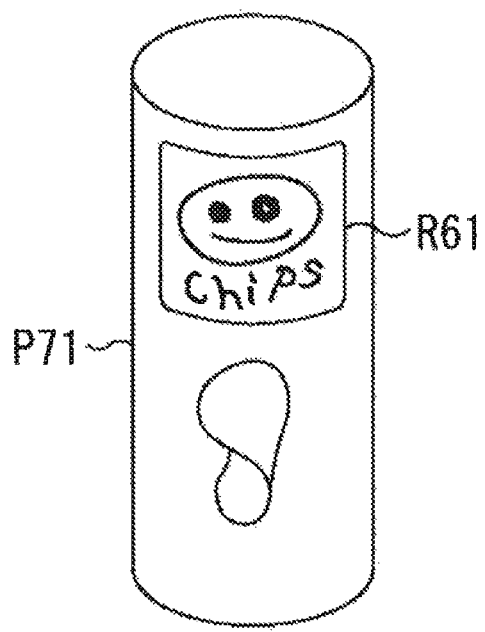
FIG. 7 is a diagram illustrating an example of a recognition target of a dictionary and a recognition target upon tracking of a pose.

In this case, also for the whole surface of the cylindrical recognition target P71, that is, a portion which is hidden in FIG. 7, a landmark is registered if a feature point is detected from the portion.

Further, the present technology can be also applied to a dynamic environment such as outdoors.

Figure 8:
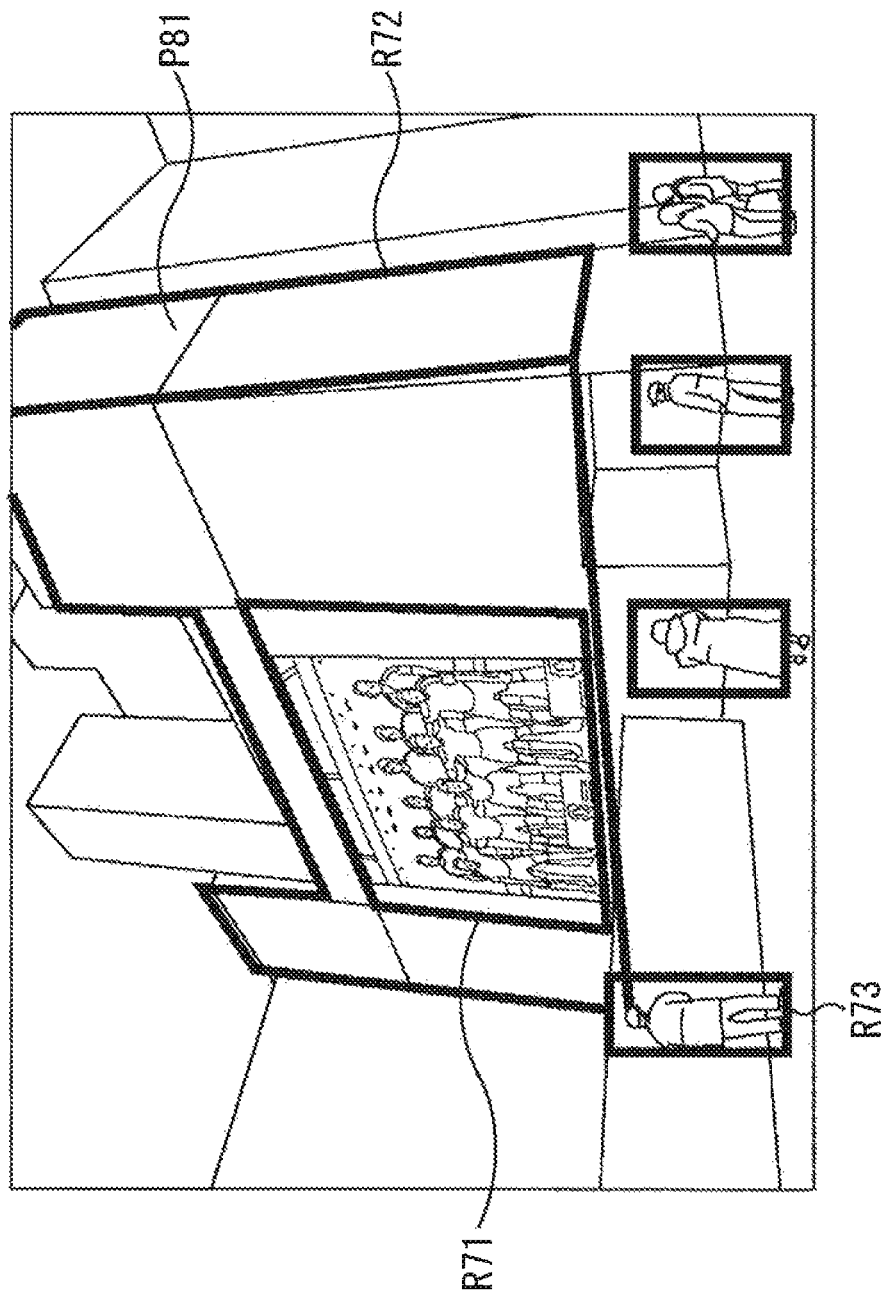
FIG. 8 is a diagram illustrating an example of a recognition target of a dictionary and a recognition target upon tracking of a pose.

That is, for example, as illustrated in FIG. 8, a dictionary for initialization is generated using a portion of a region R71 using the region R71 which is part of a building P81 located outdoors as a recognition target upon initialization.

Further, the three-dimensional map is generated and updated while a region R72 of the whole building P81 is made a recognition target upon tracking of the pose. In this example, because the building P81 is a substantially rectangular parallelepiped, it is possible to easily construct the three-dimensional shape model.

In the case where the own pose is estimated outdoors, there exist animal bodies such as passersby outdoors. However, in this example, because only the region R72 of the building P81 is made a recognition target upon tracking of the pose, and the region R73, or the like, including an animal body is not the recognition target, it is possible to prevent an animal body which is not the recognition target from being erroneously registered in the three-dimensional map.

Configuration Example of Image Processing Apparatus

A more specific embodiment of the present technology described above will be described next.

Figure 9:
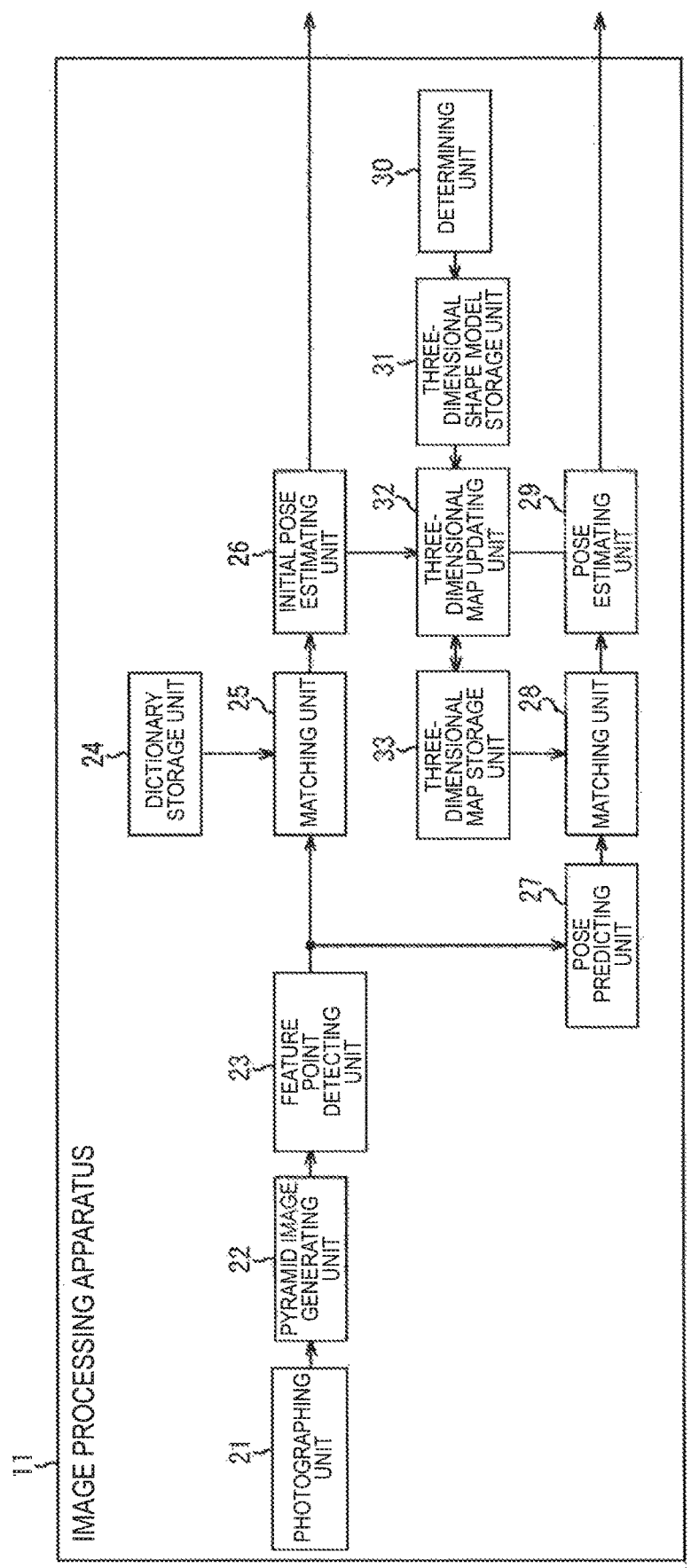
FIG. 9 is a diagram illustrating a configuration example of an image processing apparatus.

FIG. 9 is a diagram illustrating a configuration example of an embodiment of an image processing apparatus to which the present technology is applied.

The image processing apparatus 11 illustrated in FIG. 9 includes a photographing unit 21, a pyramid image generating unit 22, a feature point detecting unit 23, a dictionary storage unit 24, a matching unit 25, an initial pose estimating unit 26, a pose predicting unit 27, a matching unit 28, a pose estimating unit 29, a determining unit 30, a three-dimensional shape model storage unit 31, a three-dimensional map updating unit 32 and a three-dimensional map storage unit 33.

The photographing unit 21, which is configured with a camera, or the like, photographs a subject around the image processing apparatus 11 in real space, and supplies an input image obtained as a result of the photographing to the pyramid image generating unit 22. The pyramid image generating unit 22 performs up-sampling or down-sampling on the input image supplied from the photographing unit 21, generates a plurality of images whose scales are different from each other as pyramid images and supplies these pyramid images to the feature point detecting unit 23.

The feature point detecting unit 23 detects feature points from each pyramid image supplied from the pyramid image generating unit 22 and extracts a feature amount of each of the detected feature points from each pyramid image. The feature point detecting unit 23 supplies information indicating positions of the feature points detected from the pyramid images and a feature amount of each feature point to the matching unit 25 and the pose predicting unit 27 as a detection result of the feature points.

The dictionary storage unit 24 stores a dictionary for recognizing an object on the input image through object recognition, generated through pre-learning and supplies the stored dictionary to the matching unit 25.

Here, the dictionary stored by the dictionary storage unit 24 is a dictionary for initializing the pose of the image processing apparatus 11.

For example, the dictionary is formed with positions of the feature points detected from the region of the recognition target upon initialization in an image for learning, a feature amount extracted from the vicinity of the feature points of the image for learning, and size information indicating a size of the recognition target upon initialization in real space.

For example, in the example described with reference to FIG. 4, information indicating a length x in a lateral direction and a length y in a longitudinal direction of the region 142 of a stamp portion which is a recognition target is made the size information. Further, the feature amount of each feature point is made, for example, a template image which is an image of the region in the vicinity of the feature point of the image for learning, and the template image is prepared for each scale of the image for learning.

The matching unit 25 performs matching processing on the basis of the detection result of the feature points supplied from the feature point detecting unit 23 and the dictionary supplied from the dictionary storage unit 24 and supplies a result of the matching processing, the detection result of the feature points and the size information of the dictionary to the initial pose estimating unit 26.

The initial pose estimating unit 26 estimates an initial pose of the image processing apparatus 11 on the basis of the result of the matching processing and the size information supplied from the matching unit 25 and outputs the estimation result to a block in the subsequent stage. Further, the initial pose estimating unit 26 supplies the estimation result of the initial pose and the detection result of the feature points to the three-dimensional map updating unit 32.

The pose predicting unit 27 predicts the pose of the image processing apparatus 11 on the basis of the detection result of the feature points supplied from the feature point detecting unit 23 and supplies the prediction result and the detection result of the feature points to the matching unit 28.

The matching unit 28 performs matching processing on the basis of the prediction result of the pose and the detection result of the feature points supplied from the pose predicting unit 27 and the three-dimensional map stored in the three-dimensional map storage unit 33 and supplies the result of the matching processing and the detection result of the feature points to the pose estimating unit 29.

The pose estimating unit 29 estimates the pose of the image processing apparatus 11 on the basis of the result of the matching processing and the detection result of the feature points supplied from the matching unit 28 and outputs the estimation result to a block in the subsequent stage. That is, the pose estimating unit 29 tracks the pose. Further, the pose estimating unit 29 supplies the estimation result of the pose of the image processing apparatus 11, the result of the matching processing and the detection result of the feature points to the three-dimensional map updating unit 32.

The determining unit 30 determines the three-dimensional shape model and supplies the determined three-dimensional shape model to the three-dimensional shape model storage unit 31. The three-dimensional shape model storage unit 31 stores the three-dimensional shape model supplied from the determining unit 30 and supplies the three-dimensional shape model to the three-dimensional map updating unit 32 as necessary.

The three-dimensional map updating unit 32 generates a three-dimensional map on the basis of the estimation result of the initial pose and the detection result of the feature points supplied from the initial pose estimating unit 26 and the three-dimensional shape model supplied from the three-dimensional shape model storage unit 31 and supplies the three-dimensional map to the three-dimensional map storage unit 33.

Further, the three-dimensional map updating unit 32 updates the three-dimensional map stored in the three-dimensional map storage unit 33 on the basis of the estimation result of the pose supplied from the pose estimating unit 29, the result of the matching processing, the detection result of the feature points, and the three-dimensional shape model supplied from the three-dimensional shape model storage unit 31. That is, an updated new three-dimensional map is generated.

The three-dimensional map storage unit 33 stores the three-dimensional map supplied from the three-dimensional map updating unit 32 and supplies the stored three-dimensional map to the matching unit 28 as necessary.

<Description of Pose Estimation Processing>

Subsequently, operation of the image processing apparatus 11 will be described.

When the image processing apparatus 11 is instructed to estimate the pose of the image processing apparatus 11 itself, the image processing apparatus 11 starts photographing of the input image by the photographing unit 21 and performs pose estimation processing to estimate the pose of the image processing apparatus 11 at each time. The pose estimation processing by the image processing apparatus 11 will be described below with reference to the flowchart in FIG. 10.

Note that, upon pose estimation processing, an input image at each time is photographed by the photographing unit 21 while an object such as a recognition target in real space (three-dimensional space) is made a subject, and the input image obtained as a result of the photographing is sequentially supplied to the pyramid image generating unit 22.

In step S11, the determining unit 30 determines a three-dimensional shape model and supplies the determined three-dimensional shape model to the three-dimensional shape model storage unit 31 to make the three-dimensional shape model storage unit 31 store the three-dimensional shape model.

For example, the determining unit 30 determines the three-dimensional shape model by acquiring the three-dimensional shape model from a server, or the like, via a communication network or acquiring the three-dimensional shape model recorded in the image processing apparatus 11.

Further, the determining unit 30 may determine the three-dimensional shape model on the basis of a designated value from outside, such as through input operation by the user. In this case, for example, a value for specifying the shape and the position of the three-dimensional shape model is designated by the designated value, and the determining unit 30 determines the three-dimensional shape model on the basis of the designated value and constructs the three-dimensional shape model according to the determination.

In step S12, the feature point detecting unit 23 detects feature points from the input image.

For example, the pyramid image generating unit 22 generates a pyramid image of each scale on the basis of the input image supplied from the photographing unit 21 and supplies the pyramid image to the feature point detecting unit 23.

Further, the feature point detecting unit 23 detects feature points from the pyramid image of each scale supplied from the pyramid image generating unit 22 according to algorithm such as Harris corner and extracts a feature amount of the feature point for each feature point of the pyramid image of each scale.

For example, the feature point detecting unit 23 cuts out a region in the vicinity of the feature point in the pyramid image and makes a template image obtained as a result of cutout a feature amount. Note that a feature amount of each feature point is not limited to the template image, and may be any feature amount such as a scale invariant feature transform (SIFT) feature amount.

The feature point detecting unit 23 supplies information indicating the positions of the feature points detected on the pyramid image of each scale and the template image of each feature point to the matching unit 25 as a detection result of the feature points.

Note that, it is assumed that, in the pyramid images of respective scales, basically, feature points are detected from the corresponding positions in the pyramid images, that is, the same portion of the subject. Therefore, it is possible to say that the feature amount obtained at the feature point detecting unit 23 is a template image for each scale of each feature point detected from the input image.

In step S13, the matching unit 25 performs matching processing on the basis of a detection result of the feature points supplied from the feature point detecting unit 23 and the dictionary supplied from the dictionary storage unit 24.

Specifically, for example, the matching unit 25 calculates a degree of similarity between the template image of the feature points registered in the dictionary and the template image of the feature points detected from the pyramid image. That is, a degree of similarity between the feature points registered in the dictionary and the feature points detected from the pyramid image is calculated.

Here, any types of the degree of similarity are possible such as, for example, zero mean normalized cross correlation (ZNCC), normalized cross correlation (NCC), sum of absolute difference (SAD) and sum of squared difference (SSD). Further, the degree of similarity is calculated for each scale of the pyramid image for the template image of each scale of the feature points registered in the dictionary.

As a result of such matching processing, a pair of feature points with the highest degree of similarity, that is, a pair of a feature point registered in the dictionary and a feature point in the pyramid image with the highest degree of similarity with the feature point is obtained for each feature point registered in the dictionary.

In this case, it is possible to say that the feature point registered in the dictionary and the pyramid image which is paired with the feature point, that is, the feature point on the input image are feature points detected from the same portion of the subject in real space. In the following description, the two feature points which are paired will be also referred to as feature points corresponding to each other.

The matching unit 25 obtains information indicating the feature points which are paired obtained in this manner as a result of the matching processing and supplies the result of the matching processing, the detection result of the feature points and the size information included in the dictionary to the initial pose estimating unit 26.

In step S14, the initial pose estimating unit 26 estimates an initial pose of the image processing apparatus 11 on the basis of the result of the matching processing and the size information supplied from the matching unit 25 and outputs the estimation result to a block in the subsequent stage.

For example, the initial pose can be obtained through estimation from positional relationship between the feature points in the image for learning of the dictionary, positional relationship between the feature points on the input image (pyramid image) corresponding to the feature points, positional relationship between the feature points which are paired and the size information. That is, the position and the posture of the image processing apparatus 11 in the world coordinate system when the input image is photographed can be obtained as the initial pose.

In this event, a position of the recognition target upon initialization, for example, a position of a midpoint of the feature points registered in the dictionary, or the like, is made the origin of the world coordinate system. The initial pose obtained in this manner becomes the own pose which becomes a reference when tracking of the pose is started.

Further, the initial pose estimating unit 26 supplies the estimation result of the initial pose and the detection result of the feature points to the three-dimensional map updating unit 32.

In step S15, the three-dimensional map updating unit 32 generates a three-dimensional map on the basis of the estimation result of the initial pose and the detection result of the feature points supplied from the initial pose estimating unit 26, and the three-dimensional shape model supplied from the three-dimensional shape model storage unit 31.

That is, the three-dimensional map updating unit 32 generates a three-dimensional map using the ray tracing method as described with reference to FIG. 5.

Specifically, the three-dimensional map updating unit 32 obtains a ray vector which passes the point of view of the photographing unit 21 and the feature points on the projection image from the initial pose of the image processing apparatus 11, and the positions of the feature points on the projection image, that is, the positions (projection positions) of the feature points detected from the input image (pyramid image) in the world coordinate system.

The three-dimensional updating unit 32 then selects a feature point where the recognition target upon tracking of the pose intersects the ray vector on the world coordinate system, determined by the three-dimensional shape model. Further, the three-dimensional map updating unit 32 registers an intersection position (position of the intersection point) between the ray vector and the recognition target obtained for the selected feature point in the three-dimensional map as the landmark.

That is, the three-dimensional map updating unit 32 makes a coordinate of the position of the intersection point between the ray vector and the recognition target in the world coordinate system a coordinate of the landmark, and generates the three-dimensional map using the template image obtained from the pyramid image of each scale for the feature point corresponding to the landmark as the feature amount of the landmark.

The three-dimensional map updating unit 32 supplies the three-dimensional map obtained in this manner to the three-dimensional map storage unit 33 to make the three-dimensional map storage unit 33 store the three-dimensional map.

When the initial pose of the image processing apparatus 11 is obtained as described above, and the three-dimensional map is generated, the pose of the image processing apparatus 11 is tracked thereafter on the basis of the input image photographed at each time.

In step S16, the feature point detecting unit 23 detects feature points from the input image. Note that, because the processing of step S16 is similar to the processing of step S12, description thereof will be omitted. However, in step S16, the feature point detecting unit 23 supplies the detection result of the feature points to the pose predicting unit 27.

In step S17, the pose predicting unit 27 predicts the pose of the image processing apparatus 11 on the basis of the detection result of the feature points supplied from the feature point detecting unit 23 and supplies the prediction result and the detection result of the feature points to the matching unit 28.

For example, the pose predicting unit 27 calculates a rough pose of the image processing apparatus 11 at current time as a predicted pose by performing filter operation using an extended Kalman filter on the basis of the positions of the feature points detected from the pyramid image of each scale.

In step S18, the matching unit 28 selects a landmark to be used for matching processing on the basis of the prediction result of the pose supplied from the pose predicting unit 27 and the three-dimensional map stored in the three-dimensional map storage unit 33.

For example, because a field of view of the photographing unit 21 in the world coordinate system is known from the predicted pose of the image processing apparatus 11, it is possible to specify a landmark observed within the field of view of the photographing unit 21 at current time from the field of view of the photographing unit 21 and the position of each landmark on the world coordinate system indicated by the three-dimensional map. That is, it is possible to specify a landmark to be observed on the input image of a current frame.

Therefore, the matching unit 28 selects a landmark observed within the field of view of the photographing unit 21 at current time as a landmark to be used for matching processing. Note that, in the following description, the landmark selected in the processing of step S18 will be also referred to as a known landmark.

In step S19, the matching unit 28 performs matching processing on the basis of the detection result of the feature points supplied from the pose predicting unit 27 and the feature amount of the known landmark registered in the three-dimensional map stored in the three-dimensional map storage unit 33.

For example, in step S19, template matching which is similar to the processing of step S13 is performed as the matching processing.

Specifically, the matching unit 28 calculates a degree of similarity between the template image of each scale which is a feature amount of the known landmark and the template image of the feature points detected from the pyramid image of each scale. That is, a degree of similarity between the known landmark and the feature points detected from the pyramid image is calculated. Here, the degree of similarity of the template image may be any value such as ZNCC, NCC, SAD and SSD.

As a result of such matching processing, a pair of the known landmark and the feature points with the highest degree of similarity that is, a pair of the known landmark and the feature points on the pyramid image with the highest degree of similarity with the known landmark for each known landmark, is obtained.

The matching unit 28 makes information indicating the known landmark and the feature points which are to be paired, obtained in this manner, a result of the matching processing, and supplies the result of the matching processing, the detection result of the feature points and the coordinate of the known landmark in the world coordinate system to the pose estimating unit 29.

In step S20, the pose estimating unit 29 estimates the pose of the image processing apparatus 11 at current time (current frame) on the basis of the result of the matching processing, the detection result of the feature points and the coordinate of the known landmark in the world coordinate system supplied from the matching unit 28. That is, the position and the posture of the image processing apparatus 11 when the input image is photographed in tracking of the pose, in the world coordinate system, are obtained as the pose. Here, for example, the pose is estimated using a method such as P3P and random sample consensus (RANSAC).

The pose estimating unit 29 outputs the estimation result of the pose of the image processing apparatus 11 to a block in the subsequent stage. Further, the pose estimating unit 29 supplies the result of the matching processing, the estimation result of the pose of the image processing apparatus 11 and the detection result of the feature points to the three-dimensional map updating unit 32.

In step S21, the three-dimensional map updating unit 32 updates the known landmark in the three-dimensional map stored in the three-dimensional map storage unit 33 on the basis of the result of the matching processing and the detection result of the feature points supplied from the pose estimating unit 29.

That is, the three-dimensional map updating unit 32 extracts a template image which is a feature amount of the feature point corresponding to the known landmark among the feature amounts of respective feature points obtained as the detection result of the feature points on the basis of the result of the matching processing. The three-dimensional map updating unit 32 then updates the three-dimensional map by adding the extracted template image as the feature amount of the known landmark in the three-dimensional map.

In step S22, the three-dimensional map updating unit 32 obtains a ray vector of a new feature point on the basis of the result of the matching processing, the estimation result of the pose of the image processing apparatus 11 and the detection result of the feature points supplied from the pose estimating unit 29.

That is, the three-dimensional map updating unit 32 makes all the feature points different from the feature point corresponding to the known landmark among the feature points detected from the input image, new feature points on the basis of the result of the matching processing and the detection result of the feature points.

The three-dimensional map updating unit 32 then obtains a ray vector which passes the position of the point of view of the photographing unit 21 and the new feature point for each of the new feature points on the basis of the positions of the new feature points on the projection image in the world coordinate system, obtained from the estimation result of the pose of the image processing apparatus 11 and the detection result of the feature points.

In step S23, the three-dimensional map updating unit 32 registers a new landmark on the basis of the ray vector of the new feature point, the three-dimensional shape model stored in the three-dimensional shape model storage unit 31 and the detection result of the feature points.

Specifically, the three-dimensional map updating unit 32 specifies (determines) whether or not the ray vector of the new feature point intersects the recognition target on the world coordinate system indicated with the three-dimensional shape model, for each new feature point.

In the case where the ray vector of the new feature point does not intersect the recognition target, the three-dimensional map updating unit 32 does not register a landmark of a portion corresponding to the new feature point assuming that the new feature point is not a projection point of the portion of the recognition target.

On the other hand, in the case where the ray vector of the new feature point intersects the recognition target, the three-dimensional map updating unit 32 registers the landmark of the portion corresponding to the new feature point assuming that the new feature point is a projection point of the portion of the recognition target.

That is, the three-dimensional map updating unit 32 adds the coordinate of the position of the intersection of the ray vector obtained for the new feature point and the recognition target on the world coordinate system and the template image of each scale which is the feature amount obtained for the new feature point as information relating to the new landmark corresponding to the new feature point.

After the new landmark is registered in the three-dimensional map in this manner, and the three-dimensional map stored in the three-dimensional map storage unit 33 is updated, the processing returns to step S16, and the above-described processing is repeatedly performed. If it is instructed to finish estimation of the pose, the pose estimation processing is finished.

Note that the new landmark may be registered for a new feature point tier which a distance between the recognition target and the ray vector in the world coordinate system is equal to or less than a predetermined threshold.

In such a case, for example, a portion of the recognition target, closest to the ray vector is made a portion corresponding to the new feature point, and the portion is registered in the three-dimensional map as a new landmark. Further, for example, a position on the ray vector closest to the recognition target may be made a new landmark corresponding to the new feature point and may be registered in the three-dimensional map.

Figure 11:
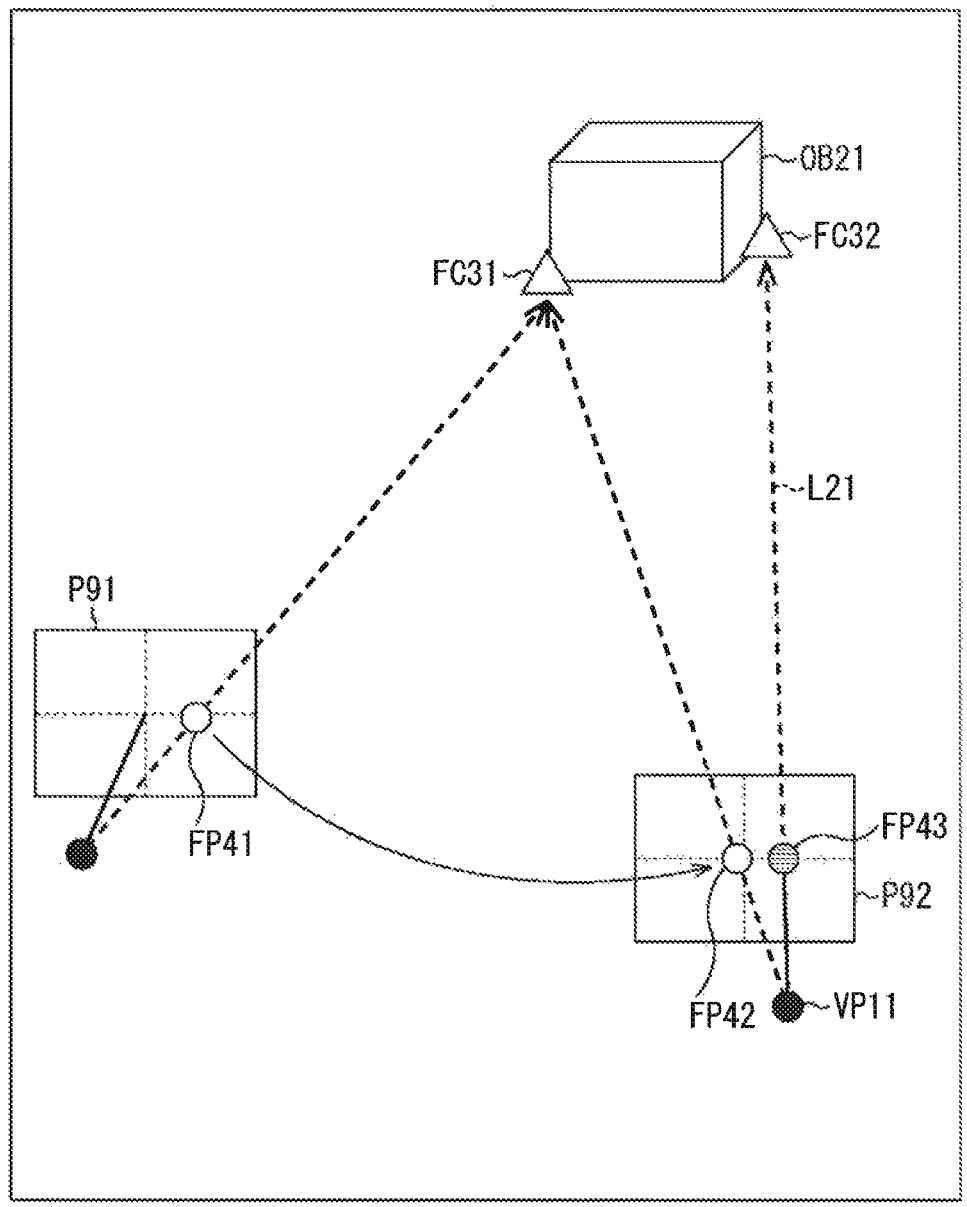
FIG. 11 is a diagram explaining pose estimation.

In the processing described above, for example, the three-dimensional map is generated and updated as illustrated in FIG. 11.

For example, it is assumed that, upon initialization of the pose of the image processing apparatus 11, an input image P91 including as a subject the recognition target OB21 whose pose and shape on the world coordinate system are specified with the three-dimensional shape model is photographed. Further, it is assumed that a feature point FP41 corresponding to a portion FC31 on the recognition target OB21 is detected from the input image P91, and an initial pose of the image processing apparatus 11 is obtained on the basis of the input image P91 and the dictionary learned in advance.

In this case, in three-dimensional map generation processing in step S15, the portion FC31 on the recognition target OB21 corresponding to the feature point FP41 is registered as a landmark, and a template image including the feature point FP41 is made a feature amount of the landmark.

When an input image P92 is photographed after the input image P91, feature points are detected from the input image P92 to estimate the pose, and the three-dimensional map is updated.

In this example, a feature point FP42 corresponding to the portion FC31 of the recognition target OB21 and a feature point FP43 corresponding to the portion FC32 of the recognition target OB21 are detected from the input image P92.

Therefore, upon pose estimation, the portion FC31 is selected as the known landmark in step S18, and matching processing in step S19 is performed. That is, matching between a template image including the feature point FP42 and a template image including the feature point FP41 registered in the three-dimensional map is performed, and it can be known that the feature point FP42 corresponds to the portion FC31.

After the matching processing is performed in this manner, the pose of the image processing apparatus 11 at time when the input image P92 is photographed is estimated on the basis of the result of the matching processing, or the like.

Then, in processing of step S21, the three-dimensional map is updated by the template image including the feature point FP42 being added as the feature amount of the portion FC31 which is the known landmark.

Further, in step S22, a ray vector L21 connecting a point of view VP11 of the photographing unit 21 and a feature point FP43 is obtained for the feature point FP43 which is a new feature point.

Further, in this example, because the ray vector L21 intersect the recognition target OB21 at the portion FC32 of the recognition target OB21, in step S23, the portion FC32 is registered in the three-dimensional map as a new landmark. That is, the portion FC32 on the recognition target OB21 corresponding to the feature point FP43 is registered as the landmark, and the template image including the feature point FP43 is made a feature amount of the landmark.

Then, thereafter, estimation of the pose of the image processing apparatus 11 and updating of the three-dimensional map are continuously performed on the basis of the input image photographed at each time.

As described above, the image processing apparatus 11 estimates the initial pose on the basis of the input image and the dictionary and generates the three-dimensional map from the estimation result and the three-dimensional shape model. Further, the image processing apparatus 11 tracks the pose on the basis of the input image and the three-dimensional map and updates the three-dimensional map on the basis of the pose of the image processing apparatus 11 and the three-dimensional shape model.

By generating or updating the three-dimensional map using the three-dimensional shape model in this manner, it is possible to prevent collapse of the three-dimensional map and occurrence of a cumulative error in pose estimation, so that it is possible to estimate the pose more accurately and robustly.

Second Embodiment

Configuration Example of Image Processing Apparatus

Note that, while an example where the pose is initialized through object recognition at the image processing apparatus 11 has been described above, the pose may be initialized using any method.

Figure 12:
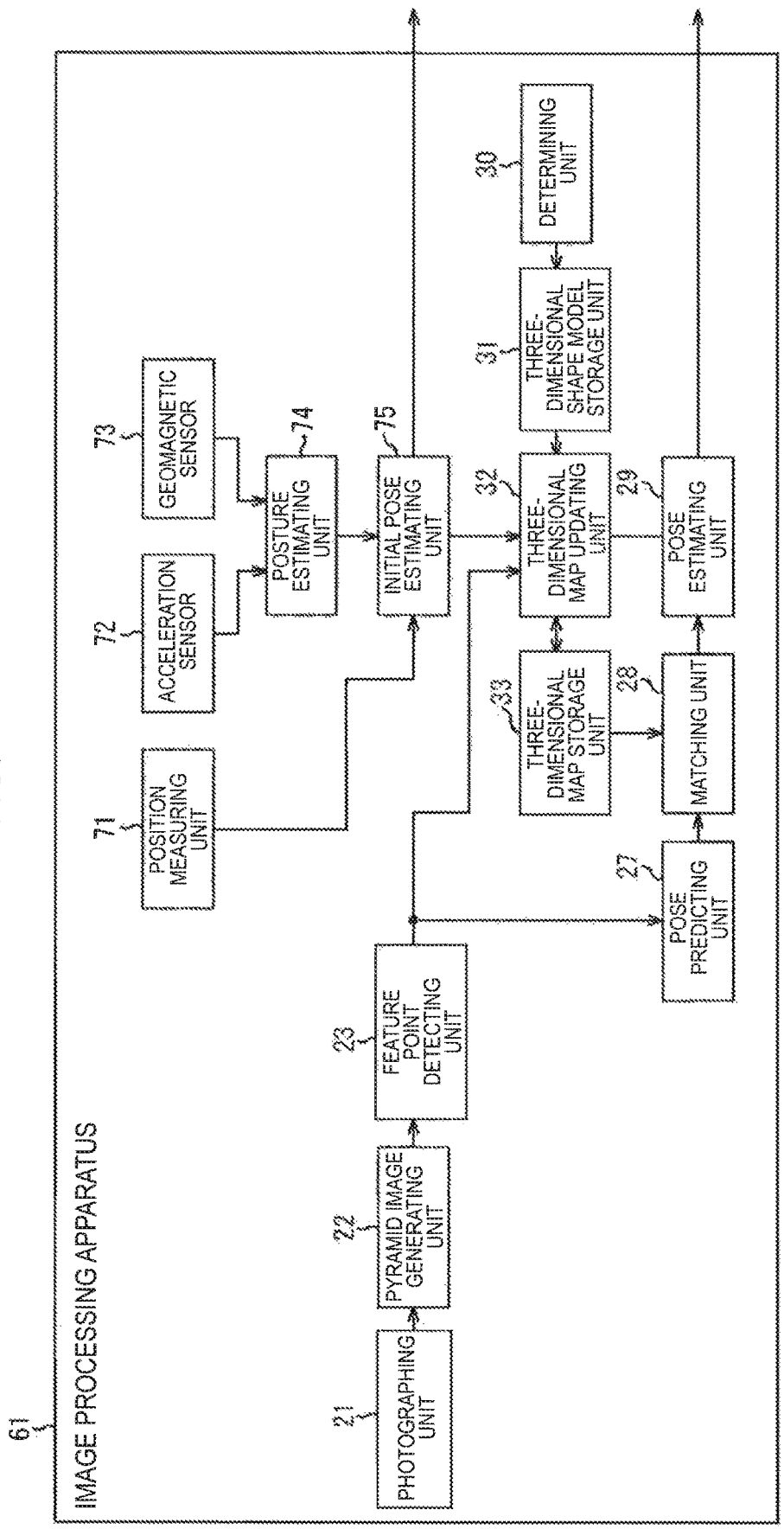
FIG. 12 is a diagram illustrating a configuration example of an image processing apparatus.

For example, the initial pose of the image processing apparatus may be measured using a sensor, or the like. In such a case, for example, the image processing apparatus is configured as illustrated in FIG. 12. Note that, in FIG. 12, the same reference numerals are assigned to portions corresponding to those in FIG. 9, and description thereof will be omitted as appropriate.

The image processing apparatus 61 illustrated in FIG. 12 includes a photographing unit 21, a pyramid image generating unit 22, a feature point detecting unit 23, a position measuring unit 71, an acceleration sensor 72, a geomagnetic sensor 73, a posture estimating unit 74, an initial pose estimating unit 75, a pose predicting unit 27, a matching unit 28, a pose estimating unit 29, a determining unit 30, a three-dimensional shape model storage unit 31, a three-dimensional map updating unit 32 and a three-dimensional map storage unit 33.

The configuration of the image processing apparatus 61 is different from the configuration of the image processing apparatus 11 in that, in place of the dictionary storage unit 24 to the initial pose estimating unit 26 of the image processing apparatus 11 illustrated in FIG. 9, the position measuring unit 71 to the initial pose estimating unit 75 are provided, and the configuration of the image processing tri apparatus 61 is the same as the configuration of the image processing apparatus 11 in other points.

The position measuring unit 71, which is configured with a GPS sensor, or the like, measures the own position, that is, a position (coordinate) of the image processing apparatus 61 on the world coordinate system and supplies the measurement result to the initial pose estimating unit 75.

For example, in the case where the position measuring unit 71 is configured with a GPS sensor, or the like, the position measuring unit 71 obtains a coordinate indicating the position of the image processing apparatus 61 in the world coordinate system by obtaining a distance from each satellite to the image processing apparatus 61 on the basis of radio waves received from some satellites.

Note that the position measuring unit 71 is not limited to the GPS sensor, and may be any sensor if the position of the image processing apparatus 61 in the world coordinate system can be measured.

For example, the position measuring unit 71 may measure the position of the image processing apparatus 61 by utilizing Wi-Fi (registered trademark). In this case, the position measuring unit 71 measures a distance from the image processing apparatus 61 to each access point on the basis of strength of signals from some access points whose positions in the world coordinate system are known, and obtains the position of the image processing apparatus 61 in the world coordinate system on the basis of the measurement result of the distances.

Further, the acceleration sensor 72 measures own inclination based on a horizontal plane of the earth, that is, inclination of the image processing apparatus 61 with respect to the horizontal plane of the earth and inclination of the image processing apparatus 61 with respect to a vertical plane perpendicular to the horizontal plane of the earth and supplies the measurement result to the posture estimating unit 74.

The geomagnetic sensor 73, which is a so-called electronic compass, measures a direction of the image processing apparatus 61 on the horizontal plane of the earth, that is, a direction the image processing apparatus 61 faces, and supplies the measurement result to the posture estimating unit 74.

The posture estimating unit 74 estimates the posture of the image processing apparatus 61 on the basis of the measurement result from the acceleration sensor 72 and the measurement result from the geomagnetic sensor 73 and supplies the estimation result to the initial pose estimating unit 75.

The initial pose estimating unit 75 estimates the initial pose of the image processing apparatus 61 on the basis of output from the position measuring unit 71 which measures the own position, output from the acceleration sensor 72 which measures the own inclination, and output from the geomagnetic sensor 73 which measures the own orientation.

Specifically, the initial pose estimating unit 75 obtains the estimation result of the initial pose of the image processing apparatus 61 by integrating the estimation result of the posture supplied from the posture estimating unit 74 and the measurement result of the position supplied from the position measuring unit 71 and supplies the obtained estimation result of the initial pose to a block in the subsequent stage and the three-dimensional map updating unit 32.

Further, in the image processing apparatus 61, the detection result of the feature points obtained at the feature point detecting unit 23 is supplied to the three-dimensional map updating unit 32 and the pose predicting unit 27.

<Description of Pose Estimation Processing>

Figure 13:
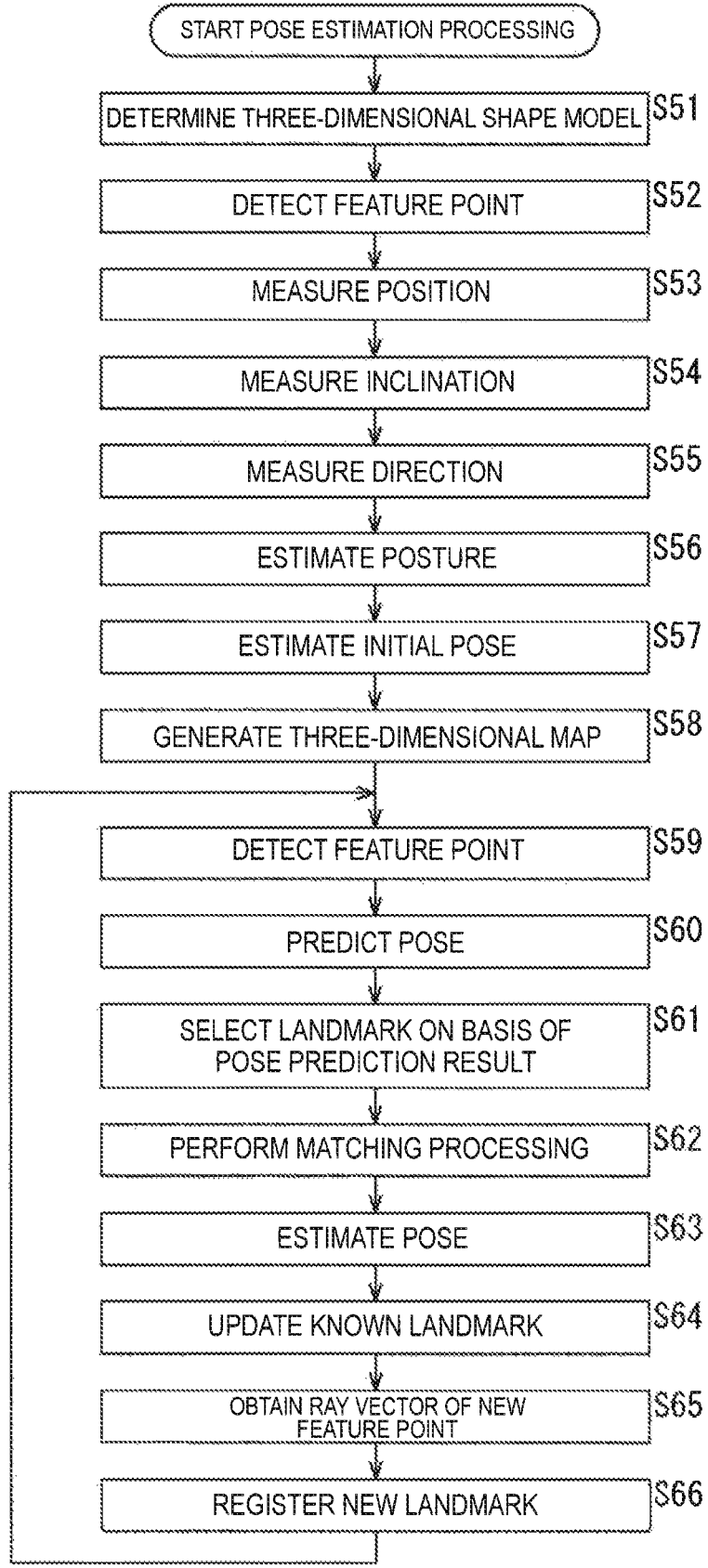
FIG. 13 is a flowchart explaining pose estimation processing.

Subsequently, pose estimation processing performed by the image processing apparatus 61 will be described with reference to the flowchart in FIG. 13.

Figure 10:
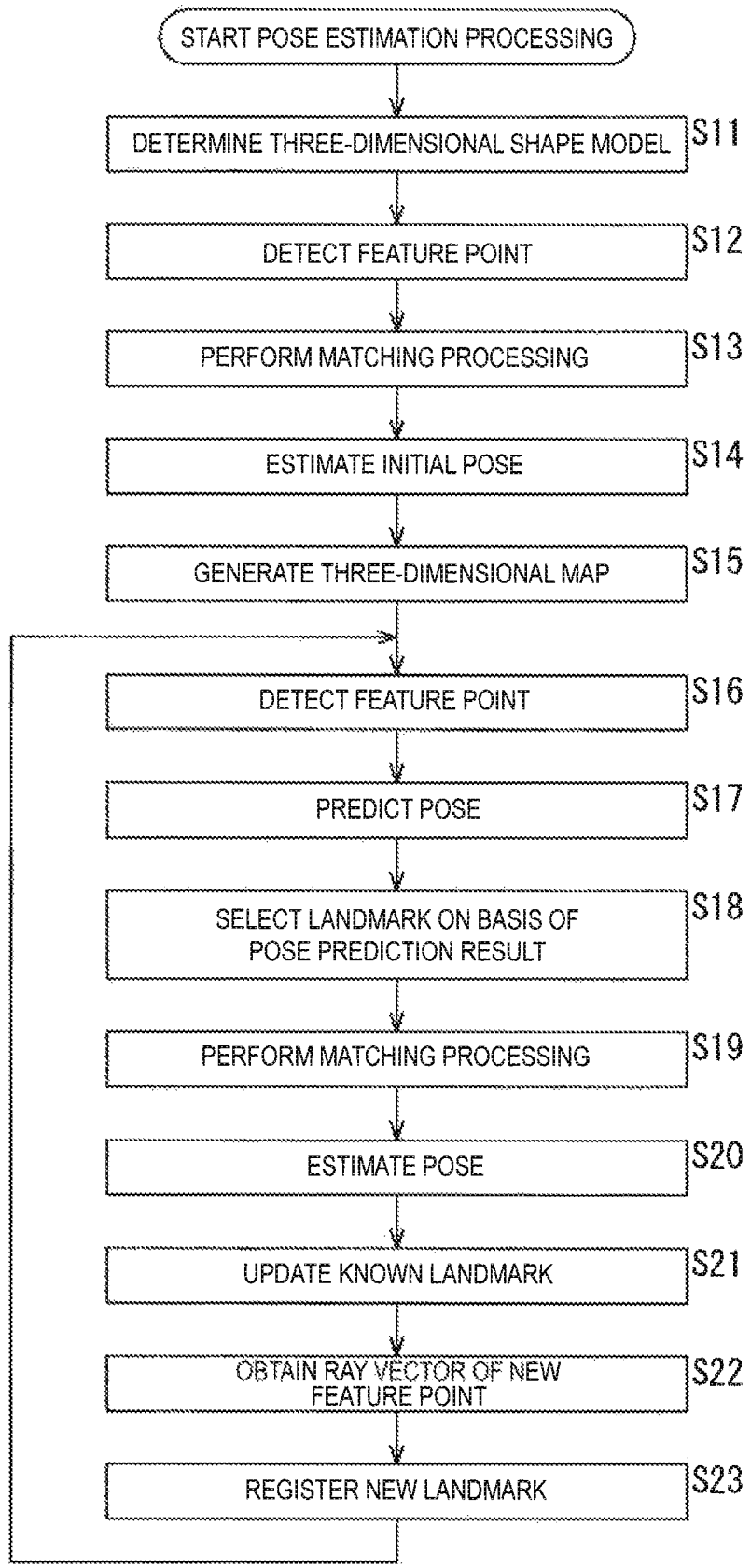
FIG. 10 is a flowchart explaining pose estimation processing.

Note that, because the processing of step S51 and step S52 is similar to the processing of step S11 and step S12 in FIG. 10, description thereof will be omitted. However, in the processing of step S52, the feature point detecting unit 23 supplies the detection result of the feature points to the three-dimensional map updating unit 32.

In step S53, the position measuring unit 71 measures a position (coordinate) of the image processing apparatus 61 on the world coordinate system and supplies the measurement result to the initial pose estimating unit 75.

In step S54, the acceleration sensor 72 measures inclination of the image processing apparatus 61 with respect to the horizontal plane of the earth and inclination of the image processing apparatus 61 with respect to the vertical plane and supplies the measurement result to the posture estimating unit 74.

In step S55, the geomagnetic sensor 73 measures a direction of the image processing apparatus 61 on the horizontal plane of the earth and supplies the measurement result to the posture estimating unit 74.

In step S56, the posture estimating unit 74 estimates the posture of the image processing apparatus 61 on the basis of the measurement result from the acceleration sensor 72 and the measurement result from the geomagnetic sensor 73 and supplies the estimation result to the initial pose estimating unit 75.

For example, the posture estimating unit 74 calculates a rotation matrix indicating a rotation amount of the image processing apparatus 61 with respect to the posture which is a reference from the inclination of the image processing apparatus 61 with respect to the horizontal plane of the earth and the vertical plane and the direction of the image processing apparatus 61 with respect to the horizontal plane of the earth and sets the rotation matrix as the estimation result of the posture of the image processing apparatus 61.

In step S57, the initial pose estimating unit 75 estimates the initial pose of the image processing apparatus 61. That is, the initial pose estimating unit 75 obtains the estimation result of the initial pose of the image processing apparatus 61 by integrating the estimation result of the posture supplied from the posture estimating unit 74 and the measurement result of the position supplied from the position measuring unit 71 and supplies the obtained estimation result of the pose to a block in the subsequent stage and the three-dimensional map updating unit 32.

When the initial pose is estimated, further, processing from step S58 to step S66 is performed, and, then, processing from step S59 to step S66 is repeatedly performed. When it is instructed to finish estimation of the pose, the pose estimation processing is finished.

Note that, because the processing from step S58 to step S66 is similar to the processing from step S15 to step S23 in FIG. 10, description thereof will be omitted.

However, in the processing of step S58, the three-dimensional map updating unit 32 generates a three-dimensional map on the basis of the estimation result of the initial pose supplied from the initial pose estimating unit 75, the detection result of the feature points supplied from the feature point detecting unit 23 and the three-dimensional shape model supplied from the three-dimensional shape model storage unit 31.

As described above, the image processing apparatus 61 estimates the initial pose on the basis of the measurement results by the position measuring unit 71 to the geomagnetic sensors 73 and generates a three-dimensional map using the estimation result and the three-dimensional shape model. Further, the image processing apparatus 61 tracks the pose on the basis of the input image and the three-dimensional map and updates the three-dimensional map on the basis of the pose of the image processing apparatus 61 and the three-dimensional shape model.

By generating or updating the three-dimensional map using the three-dimensional shape model in this manner, it is possible to prevent collapse of the three-dimensional map and occurrence of a cumulative error in pose estimation, so that it is possible to estimate the pose more accurately and robustly.

Third Embodiment

<Concerning Updating of Three-Dimensional Map>

By the way, it is preferable to register landmarks evenly over the whole recognition target upon tracking of the pose when the three-dimensional map is updated.

Figure 14:
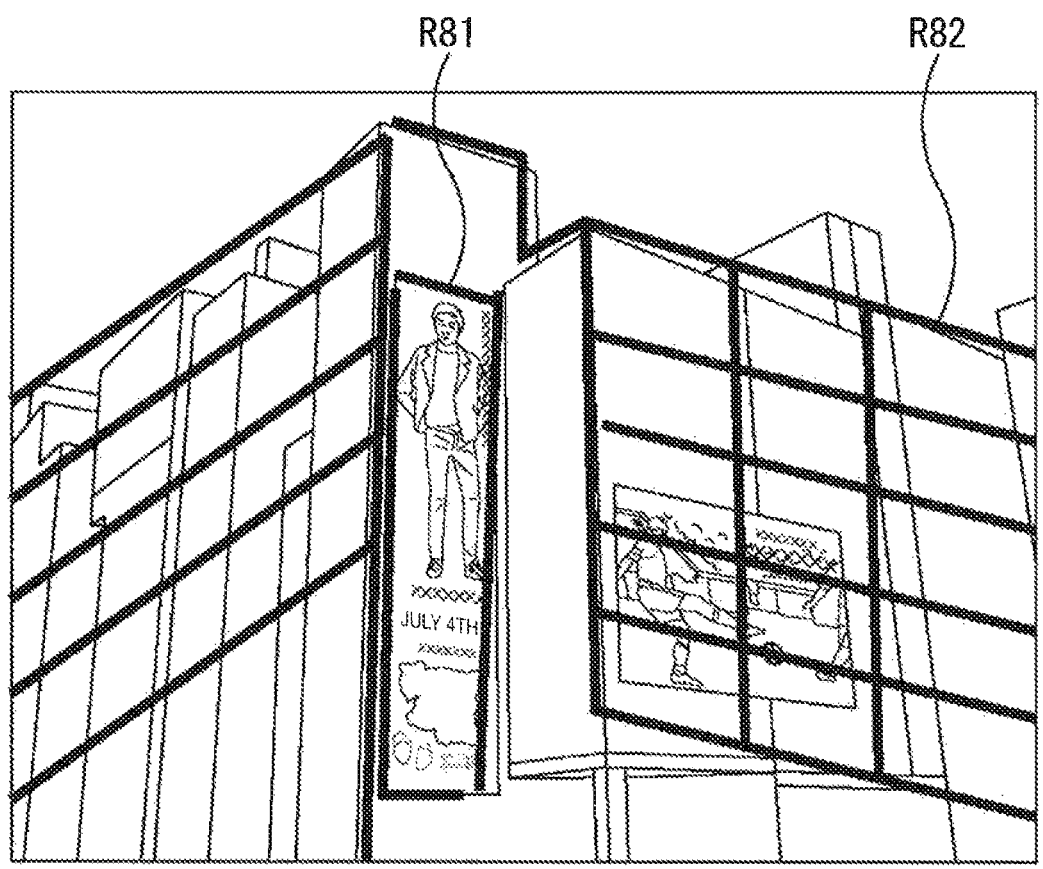
FIG. 14 is a diagram explaining registration of a landmark to a three-dimensional map.

For example, it is assumed that, as illustrated in FIG. 14, a region R81 of a portion of a building group located outdoors is made a recognition target upon initialization, and a region R82 of the whole building group is made a recognition target upon tracking of the pose. In such a case, as illustrated in FIG. 14, by dividing the region R82 into some regions with grids, and uniformly registering landmarks in each divided region (hereinafter, also referred to as a divided region), it is possible to estimate the pose more robustly and accurately.

Upon detection of feature points from the input image (pyramid image), a degree of likeness of a feature point obtained at each position of the input image is compared with a threshold th, and a position where the degree of the likeness of the feature point is equal to or greater than the threshold th is made a feature point.

Therefore, by monitoring a registration status of the landmarks for each divided region and dynamically changing the threshold th of each divided region according to the registration status, it is possible to make it easier to detect feature points from a region of a divided region portion with less registered landmarks appearing in the input image. By this means, landmarks are evenly registered in each divided region.

In this case, for example, the three-dimensional shape model only has to include a plurality of positions of respective divided regions, that is, information indicating ranges of respective divided regions at the recognition target.

Configuration Example of Image Processing Apparatus

Figure 15:
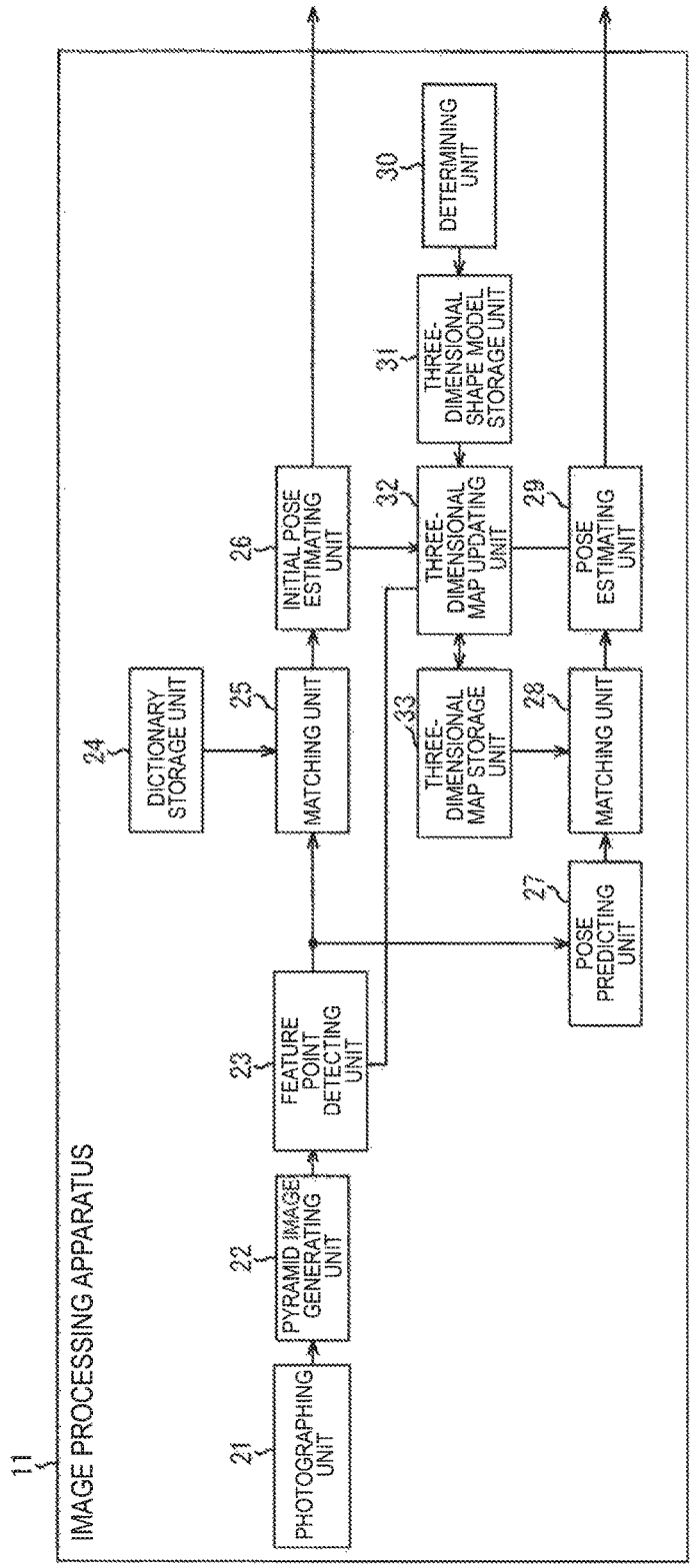
FIG. 15 is a diagram illustrating a configuration example of an image processing apparatus.

In the case where the threshold th for detecting the feature points is made variable according to the registration status of landmarks in the divided regions in this manner, the image processing apparatus 11 is configured as illustrated in, for example, FIG. 15. Note that, in FIG. 15, the same reference numerals are assigned to portions corresponding to the portions in FIG. 9, and description thereof will be omitted as appropriate.

As with the case of the image processing apparatus 11 illustrated in FIG. 9, the image processing apparatus 11 illustrated in FIG. 15 includes a photographing unit 21, a pyramid image generating unit 22, a feature point detecting unit 23, a dictionary storage unit 24, a matching unit 25, an initial pose estimating unit 26, a pose predicting unit 27, a matching unit 28, a pose estimating unit 29, a determining unit 30, a three-dimensional shape model storage unit 31, a three-dimensional map updating unit 32 and a three-dimensional map storage unit 33.

However, in the image processing apparatus 11 illustrated in FIG. 15, the three-dimensional map updating unit 32 controls feature point detection processing at the feature point detecting unit 23 according to the registration status of landmarks in each divided region of the recognition target upon tracking of the pose.

Further, in this example, the three-dimensional shape model stored in the three-dimensional shape model storage unit 31 is formed with shape information, the external parameter and information indicating positions of respective divided regions.

<Description of Pose Estimation Processing>

Figure 16:
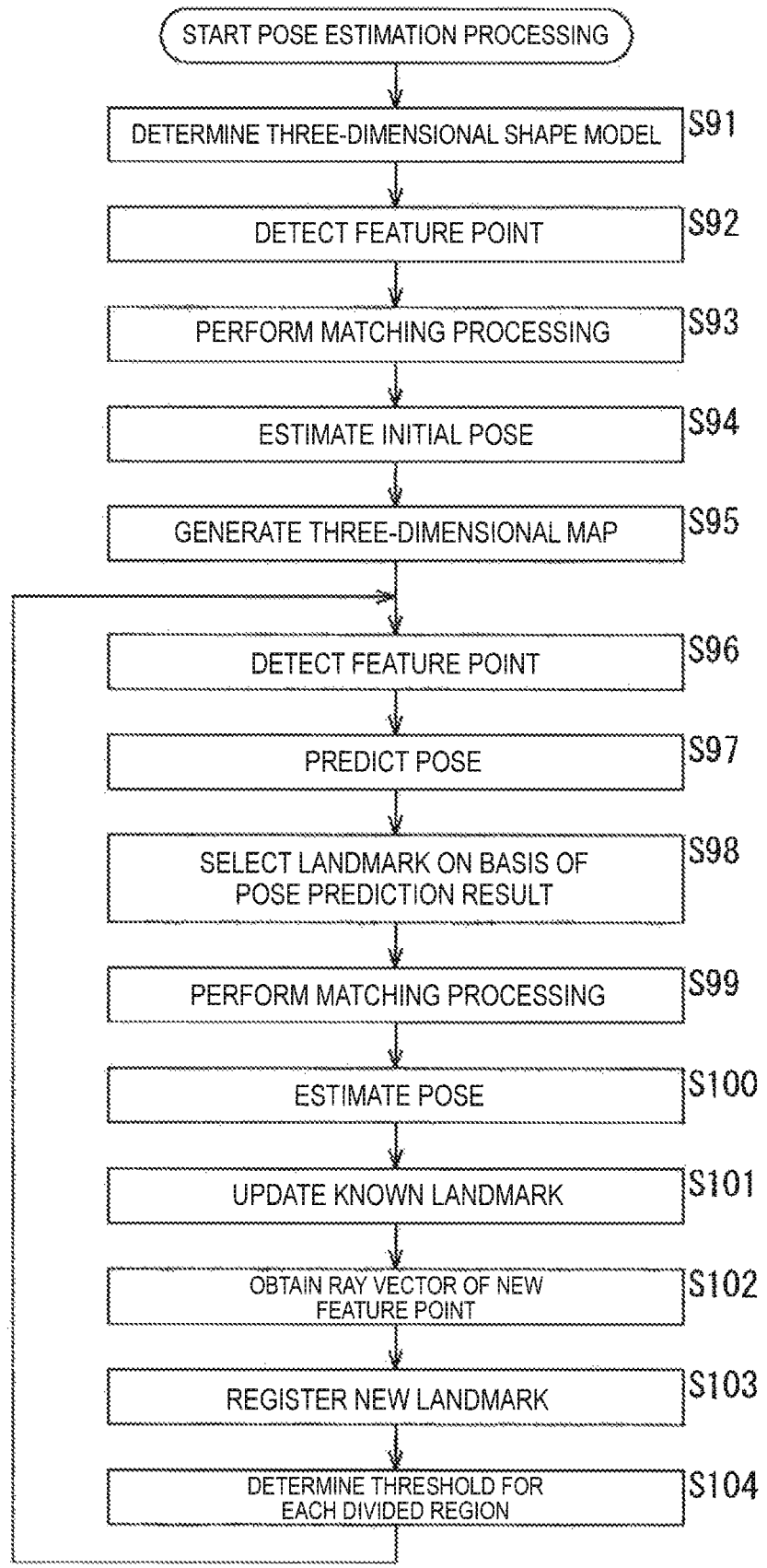
FIG. 16 is a flowchart explaining pose estimation processing.

Subsequently, the pose estimation processing performed by the image processing apparatus 11 illustrated in FIG. 15 will be described with reference to the flowchart in FIG. 16.

Note that, because the processing from step S91 to step S103 is similar the processing from step S11 to step S23 in FIG. 10, description thereof will be omitted.

However, as will be described later, in the processing of step S96, the feature point detecting unit 23 detects feature points while changing the threshold th for detecting feature points for each region of the pyramid image (input image) according to an instruction from the three-dimensional map updating unit 32.

After the three-dimensional map is updated by the processing of step S103 being performed, in step S104, the three-dimensional map updating unit 32 determines the threshold th for each of a plurality of divided regions of the recognition target and supplies the determination result to the feature point detecting unit 23.

For example, the three-dimensional map updating unit 32 specifies the number of landmarks registered within the divided region for each divided region of the recognition target from the three-dimensional shape model stored in the three-dimensional shape model storage unit 31 and the three-dimensional map stored in the three-dimensional map storage unit 33.

The three-dimensional map updating unit 32 then determines the threshold th for the divided region according to the number of landmarks within the divided region.

For example, the three-dimensional map updating unit 32 resets the threshold th of the divided region to a greater value for the divided region where the number of landmarks which have already been registered is equal to or larger than a predetermined number, so as to make it difficult that a new landmark is registered within the divided region. That is, it is made difficult to detect feature points from a region corresponding to the divided region on the input image.

Meanwhile, the three-dimensional map updating unit 32 resets the threshold th of the divided region to a smaller value for the divided region where the number of registered landmarks is less than the predetermined number, so as to make it easier that a new landmark is registered in the divided region. Note that the threshold th of each divided region may be changed in a stepwise manner according to the number of landmarks registered in each divided region.

After the threshold th of each divided region is determined in this manner, the three-dimensional map updating unit 32 specifies the position (range) of each divided region in the input image of a current frame (current time) on the basis of the pose of the image processing apparatus 11 at current time and the three-dimensional shape model. That is, a region in which the divided region appears in the input image is specified.

The three-dimensional map updating unit 32 then supplies the specification result of the positions of the respective divided regions in the input image and the threshold th for each divided region to the feature point detecting unit 23 and controls detection of the feature points from an input image of the next frame.

Specifically, the three-dimensional map updating unit 32 controls the feature point detecting unit 23 so that feature points are detected using the threshold th determined for the divided region in the region of the input image of the next frame, located at the same position as the region which is the divided region of the input image of the current frame.

Note that, while the threshold th of each region of the input image of the next frame is determined on the basis of the input image and the pose of the current frame here, unless the image processing apparatus 11 drastically and largely moves, a great mismatch should not occur in a region corresponding to each divided region in the input image between the current frame and the next frame. Therefore, the three-dimensional map updating unit 32 controls detection of the feature points assuming that the region corresponding to the divided region in the input image of the next frame is located at the same position as the region corresponding to the divided region in the input image of the current frame.

After the threshold th is determined for each divided region, the processing returns to step S96 and the above-described processing is repeatedly performed.

For example, in step S96, the feature point detecting unit 23 specifies each divided region on the pyramid image according to control by the three-dimensional map updating unit 32 and detects feature points using the threshold th determined for each divided region for the specified divided regions.

Further, when it is instructed to finish estimation of the pose, the pose estimation processing is finished.

As described above, the image processing apparatus 11 determines the threshold th of the divided region according to the registration status of the landmark in each divided region and detects feature points from the input image using the determined threshold th. By this means, landmarks are evenly registered in each divided region, so that it is possible to estimate the pose more robustly and accurately.

Fourth Embodiment

<Concerning Updating of Three-Dimensional Map>

Figure 17:
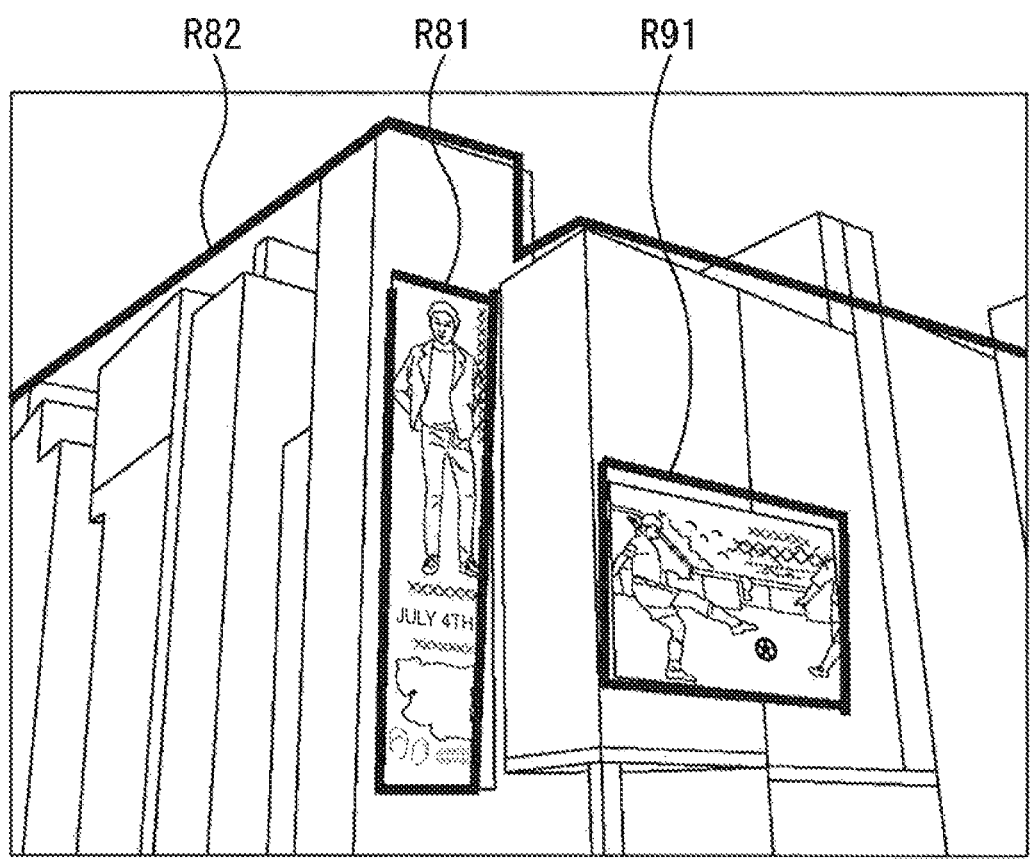
FIG. 17 is a diagram explaining registration of a landmark in a three-dimensional map.

Further, for example, as illustrated in FIG. 17, landmarks may be intensively registered from a region of part of the recognition target upon tracking of the pose. Note that, in FIG. 17, the same reference numerals are assigned to portions corresponding to the portions in FIG. 14, and description thereof will be omitted as appropriate.

In this example, a region R91 which is part of the region R82 which is made the recognition target is designated as an important region. Note that any method can be used as a method for designating the important region, such as designation of the important region from the region R82 of the recognition target on the input image by the user, or the like, and designation of a region which is made the important region from a plurality of regions which are candidates for the important region by the user, or the like. Further, the important region may be determined in advance, in which case, it is only necessary to make the three-dimensional shape model include information indicating the position (range) of the important region.

In the case where the region R91 which is part of the region R82 which is made the recognition target is made the important region in this manner, when the important region appears as the subject in the input image, if the threshold th in the important region on the input image is made lower, feature points are detected more easily from the important region than from other regions. By this means, landmarks are intensively registered, that is, more landmarks are registered in the region R91.

Note that, while a case where there is one important region will be described here, there may be a plurality of important regions.

In the case where the important region is determined in this manner, the image processing apparatus 11 is configured as illustrated in, for example, FIG. 15. Further, the three-dimensional shape model stored in the three-dimensional shape model storage unit 31 of the image processing apparatus 11 is formed with shape information, the external parameter and information indicating the position (range) of the important region.

<Description of Pose Estimation Processing>

Figure 18:
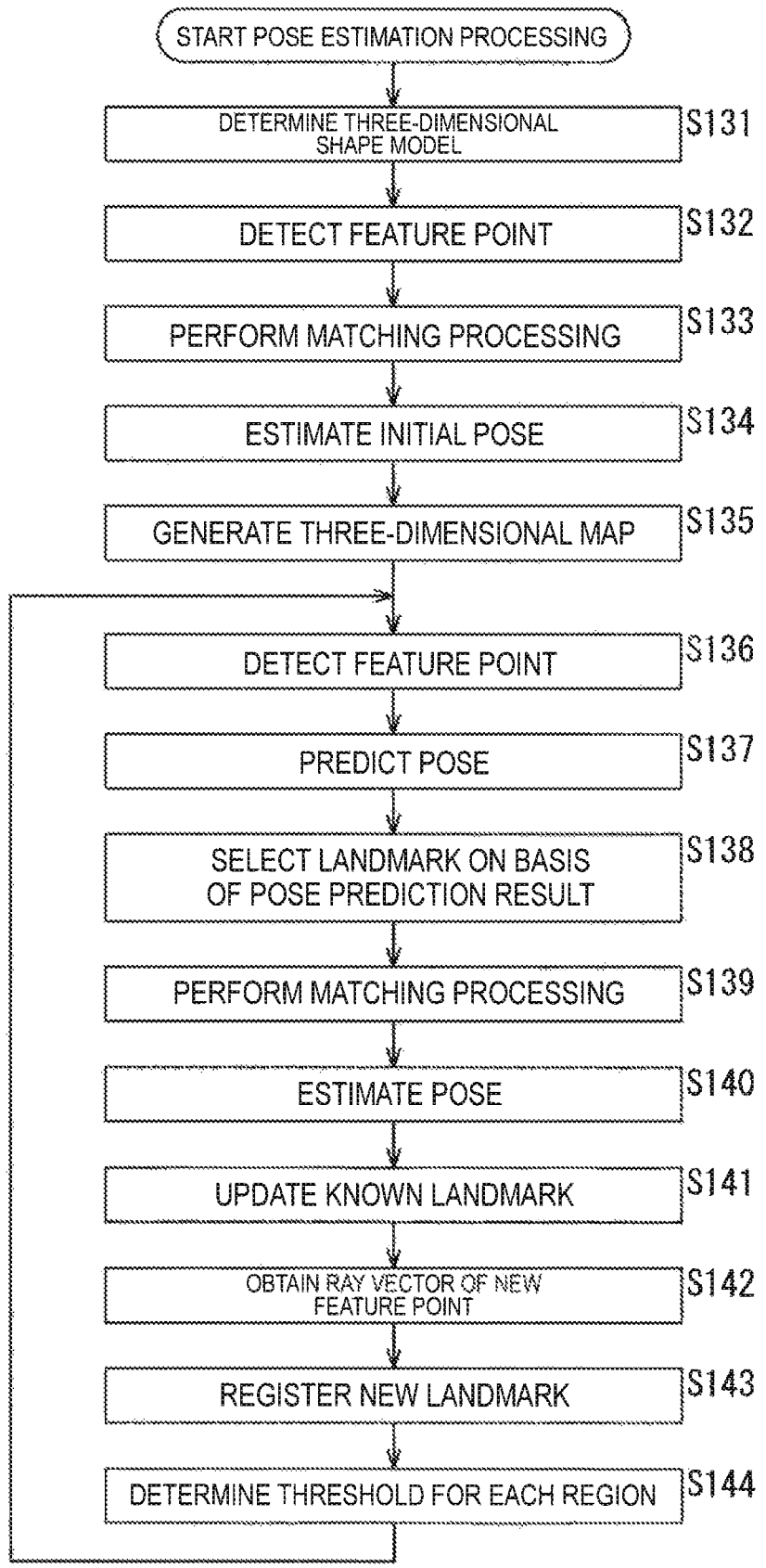
FIG. 18 is a flowchart explaining pose estimation processing.

Subsequently, the pose estimation processing performed by the image processing apparatus 11 illustrated in FIG. 15 will be described with reference to the flowchart in FIG. 18.

Note that, because the processing from step S131 to step S143 is similar to the processing from step S11 to step S23 in FIG. 10, description thereof will be omitted.

However, in the processing of step S136, as will be described later, the feature point detecting unit 23 detects feature points while changing the threshold th for detecting feature points for each region of the pyramid image (input image) according to an instruction from the three-dimensional map updating unit 32.

After the three-dimensional map is updated by the processing of step S143 being performed, in step S144, the three-dimensional map updating unit 32 determines the threshold th of each region and supplies the determination result to the feature point detecting unit 23.

For example, the three-dimensional map updating unit 32 specifies the position (range) of the important region in the input image of the current frame (current time) on the basis of the pose of the image processing apparatus 11 at current time and the three-dimensional shape model. That is, a region where the important region appears in the input image is specified.

In the case where there is an important region in the input image of the current frame, the three-dimensional map updating unit 32 sets a lower threshold th than the normal threshold th for the important region, in more detail, a region where the important region appears as the subject. Further, the threshold th determined in advance is set for a region other than the important region without change.

The three-dimensional map updating unit 32 supplies the specification result of the position of the important region in the input image and the threshold th of the important region to the feature point detecting unit 23 and controls detection of feature points from the input image of the next frame.

Specifically, the three-dimensional map updating unit 32 controls the feature point detecting unit 23 so that feature points are detected using the threshold th determined for the important region in the region of the input image of the next frame located at the same position as the position of the region which is made the important region in the input image of the current frame.

Here, as with the case of the above-described third embodiment, detection of feature points is controlled assuming that the region corresponding to the important region in the input image of the next frame is located at the same position as the position of the region corresponding to the important region in the input image of the current frame.

Note that, in the case where there is no important region in the input image of the current frame, the threshold th is not particularly changed. Further, in the case where there is an important region in the input image, the threshold th may be lowered for the whole input image instead of the threshold th being lowered for only for the important region.

After the threshold th of each region is determined, the processing returns to step S136, and the above-described processing is repeatedly performed.

For example, in step S136, the feature point detecting unit 23 specifies an important region on the pyramid image according to control by the three-dimensional map updating unit 32 and detects feature points using the threshold th determined for the important region for the specified important region.

Further, when it is instructed to finish estimation of the pose, the pose estimation processing is finished.

As described above, in the case where there is an important region in the input image, the image processing apparatus 11 detects feature points from the input image using the threshold th while lowering the threshold th for the important region. By this means, portions within the important region are intensively registered as landmarks, so that it is possible to estimate the pose more robustly and accurately.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 19:
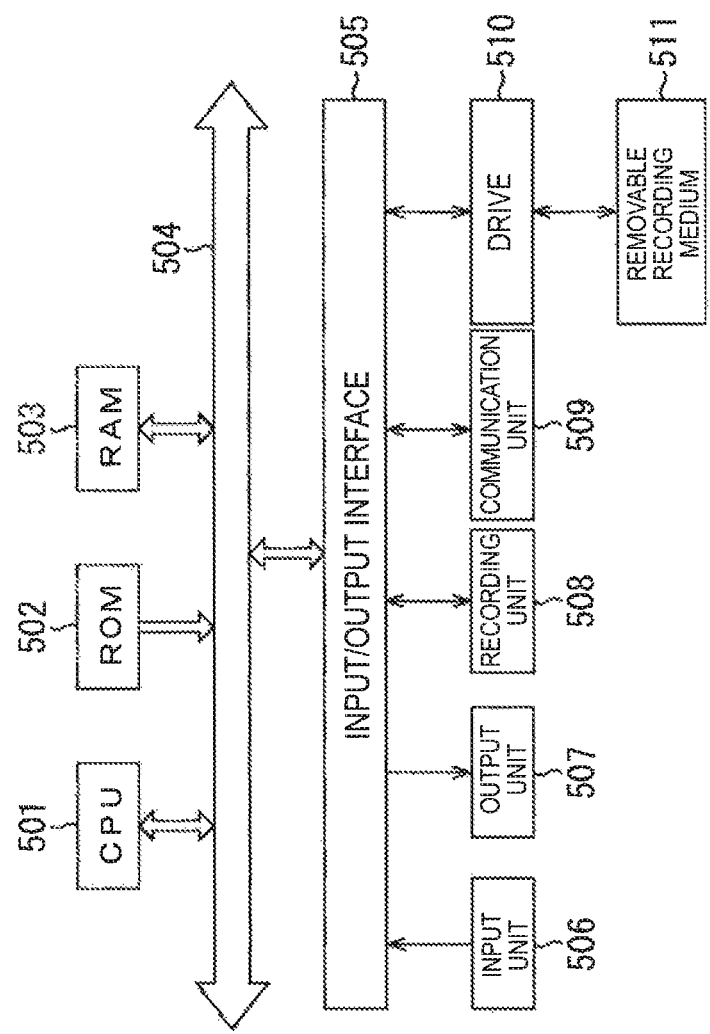
FIG. 19 is a diagram illustrating a configuration example of a computer.

FIG. 19 is a block diagram showing an example configuration of the hardware of a computer that executes the series of processes described earlier according to a program.

In a computer, a CPU (Central Processing Unit) 501, a ROM (Read Only Memory) 502, and a RAM (Random Access Memory) 503 are mutually connected by a bus 504.

An input/output interface 505 is also connected to the bus 504. An input unit 506, an output unit 507, a recording unit 508, a communication unit 509, and a drive 510 are connected to the input/output interface 505.

The input unit 506 is configured from a keyboard, a mouse, a microphone, imaging element or the like. The output unit 507 configured from a display, a speaker or the like. The recording unit 508 is configured from a hard disk, a non-volatile memory or the like. The communication unit 509 is configured from a network interface or the like. The drive 510 drives a removable recording medium 511 such as a magnetic disk, an optical disk, a magneto-optical disk, a semiconductor memory or the like.

In the computer configured as described above, as one example the CPU 501 loads a program recorded in the recording unit 508 via the input/output interface 505 and the bus 504 into the RAM 503 and executes the program to carry out the series of processes described earlier.

As one example, the program executed by the computer (the CPU 501) may be provided by being recorded on the removable recording medium 511 as a packaged medium or the like. The program can also be provided via a wired or wireless transfer medium, such as a local area network, the Internet, or a digital satellite broadcast.

In the computer, by loading the removable recording medium 511 into the drive 510, the program can be installed into the recording unit 508 via the input/output interface 505. It is also possible to receive the program from a wired or wireless transfer medium using the communication unit 509 and install the program into the recording unit 508. As another alternative, the program can be installed in advance into the ROM 502 or the recording unit 508.

Note that the program executed by the computer may be a program in which processes are carried out in a time series in the order described in this specification or may be a program in which processes are carried out in parallel or at necessary timing, such as when the processes are called.

In addition, an embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

(1)

An image processing apparatus including:

a three-dimensional map generating unit configured to, on the basis of a shape model indicating a position and a shape of a recognition target in three-dimensional space and a detection result of a feature point from an input image obtained by photographing a subject in the three-dimensional space, register a portion of the recognition target corresponding to the feature point as a landmark and generate a three-dimensional map indicating a position of the landmark in the three-dimensional space.

(2)

The image processing apparatus according to (1), in which the three-dimensional map generating unit obtains a ray vector which passes a position of a point of view when the input image is photographed and a position of the feature point of the input image on a projection plane and generates the three-dimensional map on the basis of the ray vector and the shape model.

(3)

The image processing apparatus according to (2), in which, in the case where the ray vector intersects the recognition target in the three-dimensional space, the three-dimensional map generating unit registers a position where the recognition target intersects the ray vector in the three dimensional map as the landmark.

(4)

The image processing apparatus according to (2), in which, in the case where a distance between the ray vector and the recognition target in the three-dimensional space is equal to or less than a predetermined threshold, the three-dimensional map generating unit registers a position in the recognition target closest to the ray vector in the three-dimensional map as the landmark.

(5)

The image processing apparatus according to any one of (1) to (4), further including:

a pose estimating unit configured to estimate a pose on the basis of the three-dimensional map and a detection result of the feature point from the input image.

(6)

The image processing apparatus according to (5), in which the pose estimating unit tracks the pose on the basis of the three-dimensional map and the detection result of the feature point from the input image.

(7)

The image processing apparatus according to any one of (1) to (6), in which the three-dimensional map generating unit controls detection of the feature point for each region in a new input image on the basis of the number of the landmarks within each of a plurality of divided regions obtained by dividing a region of the recognition target, and a result of specifying a region corresponding to the divided region in the input image.

(8)

The image processing apparatus according to (7), in which the three-dimensional map generating unit controls detection of the feature point such that more feature points are detected from a region of the new input image corresponding to the divided region with less landmarks registered in the three-dimensional map.

(9)

The image processing apparatus according to any one of (1) to (6), in which the three-dimensional map generating unit specifies a region corresponding to a specific region on the recognition target in the input image and controls detection of the feature point from the new input image on the basis of a result of specifying the region corresponding to the specific region.

(10)

The image processing apparatus according to (9), in which the three-dimensional map generating unit controls detection of the feature point such that more feature points are detected from the region corresponding to the specific region in the new input image.

(11)

The image processing apparatus according to any one of (1) to (10), further including:

an initial pose estimating unit configured to estimate an initial pose through object recognition on the basis of a detection result of the feature point from the input image and a dictionary obtained through learning in advance.

(12)

The image processing apparatus according to any one of (1) to (10), further including:

an initial pose estimating unit configured to estimate an initial pose on the basis of output from a sensor which measures a position of the image processing apparatus and output from a sensor which measure inclination of the image processing apparatus.

(13)

The image processing apparatus according to (11) or (12), in which the three-dimensional map generating unit generates the three-dimensional map on the basis of an estimation result of the initial pose, a detection result of the feature point from the input image, and the shape model.

(14)

An image processing method including steps of:

on the basis of a shape model indicating a position and a shape of a recognition target in three-dimensional space and a detection result of a feature point from an input image obtained by photographing a subject in the three-dimensional space, registering a portion of the recognition target corresponding to the feature point as a landmark and generating a three-dimensional map indicating a position of the landmark in the three-dimensional space.

(15)

A program causing a computer to execute processing including steps of:

on the basis of a shape model indicating a position and a shape of a recognition target in three-dimensional space and a detection result of a feature point from an input image obtained by photographing a subject in the three-dimensional space, registering a portion of the recognition target corresponding to the feature point as a landmark and generating a three-dimensional map indicating a position of the landmark in the three-dimensional space.

REFERENCE SIGNS LIST 11 image processing apparatus
21 photographing unit
23 feature point detecting unit
24 dictionary storage unit
25 matching unit
26 initial pose estimating unit
27 pose predicting unit
28 matching unit
29 pose estimating unit
31 three-dimensional shape model storage unit
32 three-dimensional map updating unit
33 three-dimensional map storage unit
71 position measuring unit
72 acceleration sensor
73 geomagnetic sensor
74 posture estimating unit
75 initial pose estimating unit

The invention claimed is:

1. An image processing apparatus comprising:
a feature point detecting unit configured to detect a feature point from an input image obtained by photographing a subject including a recognition target in a three-dimensional space; and
a three-dimensional map generating unit configured to, on the basis of a shape model indicating a position and a shape of the recognition target and a detection result of the feature point, register a portion of the recognition target corresponding to the feature point as a landmark, and generate a three-dimensional map indicating a position of the landmark in the three-dimensional space,
wherein the three-dimensional map generating unit obtains a ray vector which passes a position of a point of view when the input image is photographed and a position of the feature point of the input image on a projection plane and generates the three-dimensional map on the basis of the ray vector and the shape model, and wherein the feature point detecting unit and the three-dimensional map generating unit is implemented via at least one processor.

2. The image processing apparatus according to claim 1, wherein the feature point detecting unit detects a plurality of feature points from the input image obtained by photographing the subject including the recognition target in the three-dimensional space, and
wherein the three-dimensional map generating unit registers, on the basis of the shape model, the portion of the recognition target corresponding to the feature point, of the plurality of feature points, as the landmark, and does not register portions of the input image corresponding to other feature points, of the plurality of feature points, as the landmark.

3. The image processing apparatus according to claim 1, wherein, in a case where the ray vector intersects the recognition target in the three-dimensional space, the three-dimensional map generating unit registers a position where the recognition target intersects the ray vector in the three-dimensional map as the landmark.

4. The image processing apparatus according to claim 1, wherein, in a case where a distance between the ray vector and the recognition target in the three-dimensional space is equal to or less than a predetermined threshold, the three-dimensional map generating unit registers a position in the recognition target closest to the ray vector in the three-dimensional map as the landmark.

5. The image processing apparatus according to claim 1, further comprising:
a pose estimating unit configured to estimate a pose on the basis of the three-dimensional map and a detection result of the feature point from the input image,
wherein the pose estimating unit is implemented via at least one processor.

6. The image processing apparatus according to claim 5, wherein the pose estimating unit tracks the pose on the basis of the three-dimensional map and the detection result of the feature point from the input image.

7. The image processing apparatus according to claim 1, wherein the three-dimensional map generating unit controls detection of the feature point for each region in a new input image on the basis of a number of landmarks within each of a plurality of divided regions obtained by dividing a region of the recognition target, and a result of specifying a region corresponding to the divided region in the input image.

8. The image processing apparatus according to claim 7, wherein the three-dimensional map generating unit controls detection of the feature point such that more feature points are detected from a region of the new input image corresponding to a region of the plurality of divided regions with less landmarks registered in the three-dimensional map.

9. The image processing apparatus according to claim 7, wherein the three-dimensional map generating unit specifies a region corresponding to a specific region on the recognition target in the input image and controls detection of the feature point from the new input image on the basis of a result of specifying the region corresponding to the specific region.

10. The image processing apparatus according to claim 9, wherein the three-dimensional map generating unit controls detection of the feature point such that more feature points are detected from the region corresponding to the specific region in the new input image.

11. The image processing apparatus according to claim 1, further comprising:
an initial pose estimating unit configured to estimate an initial pose through object recognition on the basis of a detection result of the feature point from the input image and a dictionary obtained through learning in advance,
wherein the initial pose estimating unit is implemented via at least one processor.

12. The image processing apparatus according to claim 1, further comprising:
an initial pose estimating unit configured to estimate an initial pose on the basis of output from a sensor which measures a position of the image processing apparatus and output from a sensor which measure inclination of the image processing apparatus,
wherein the initial pose estimating unit is implemented via at least one processor.

13. The image processing apparatus according to claim 11,
wherein the three-dimensional map generating unit generates the three-dimensional map on the basis of an estimation result of the initial pose, a detection result of the feature point from the input image, and the shape model.

14. An image processing method comprising:
detecting a feature point from an input image obtained by photographing a subject including a recognition target in a three-dimensional space;
on the basis of a shape model indicating a position and a shape of the recognition target and a detection result of the feature point, registering a portion of the recognition target corresponding to the feature point as a landmark and generating a three-dimensional map indicating a position of the landmark in the three-dimensional space;
obtaining a ray vector which passes a position of a point of view when the input image is photographed and a position of the feature point of the input image on a projection plane; and
generating the three-dimensional map on the basis of the ray vector and the shape model.

15. A non-transitory computer-readable recording medium having embodied thereon a program, which when executed by a computer causes the computer to execute a method, the method comprising:
detecting a feature point from an input image obtained by photographing a subject including a recognition target in a three-dimensional space;
on the basis of a shape model indicating a position and a shape of the recognition target and a detection result of the feature point, registering a portion of the recognition target corresponding to the feature point as a landmark and generating a three-dimensional map indicating a position of the landmark in the three-dimensional space;
obtaining a ray vector which passes a position of a point of view when the input image is photographed and a position of the feature point of the input image on a projection plane; and
generating the three-dimensional map on the basis of the ray vector and the shape model.

* * * * *